(12) United States Patent
Ciamillo

(10) Patent No.: US 8,132,482 B2
(45) Date of Patent: Mar. 13, 2012

(54) MANUAL TRANSMISSION SHIFTER HAVING CONTINUOUSLY ADJUSTABLE THROW

(76) Inventor: George J. Ciamillo, Augusta, GA (US)

( * ) Notice: Subject to any disclaimer, the term of this patent is extended or adjusted under 35 U.S.C. 154(b) by 0 days.

(21) Appl. No.: 12/040,892

(22) Filed: Mar. 1, 2008

(65) Prior Publication Data

US 2008/0173120 A1 Jul. 24, 2008

Related U.S. Application Data

(63) Continuation-in-part of application No. 11/044,540, filed on Jan. 27, 2005, now Pat. No. 7,854,181.

(60) Provisional application No. 60/892,507, filed on Mar. 1, 2007.

(51) Int. Cl.
*G05G 1/04* (2006.01)
*G05G 5/00* (2006.01)

(52) U.S. Cl. ........................................ 74/525; 74/473.29

(58) Field of Classification Search ............... 74/473.14, 74/473.15, 473.29, 473.3, 473.33, 522, 523, 74/525, 528, 551.1, 551.3, 551.4
See application file for complete search history.

(56) References Cited

U.S. PATENT DOCUMENTS 6,360,627 B1 * 3/2002 Buckingham et al. ........ 74/473.3
7,032,474 B2 * 4/2006 Tucker ........................ 74/473.29

* cited by examiner

*Primary Examiner* — Thomas R Hannon
*Assistant Examiner* — Phillip A Johnson
(74) *Attorney, Agent, or Firm* — Ariel S. Bentolila; Bay Area IP Group, LLC

(57) ABSTRACT

An automobile manual transmission shifter is provided that includes a shifter central shaft means for dampening at least part of the vibration transmitted from the manual automobile transmission, an adjustable connector attaching an upper and lower portions of the shaft to vary the throw of the shifter, and an adjustable swivel shifter handle means for maintaining a continuous perpendicular gripping position while allowing rotatational adjustment of the swivel shifter handle means about the shifter central shaft means. Some embodiments may not include the vibration dampening means.

30 Claims, 18 Drawing Sheets

MANUAL TRANSMISSION SHIFTER HAVING CONTINUOUSLY ADJUSTABLE THROW

CROSS-REFERENCE TO RELATED APPLICATIONS

The present continuation-in-part patent application claims priority benefit of the U.S. nonprovisional patent application Ser. No. 11/044,540 filed on Jan. 27, 2005 now U.S. Pat. No. 7,854,181, under 35 U.S.C. 120, which is hereby incorporated by reference for all purposes. The present continuation-in-part patent application also claims priority benefit of the U.S. provisional application for patent Ser. No. 60/892,507 filed on Mar. 1, 2007 under 35 U.S.C. 119(e). The contents of this related provisional application are incorporated herein by reference for all purposes.

FIELD OF THE INVENTION

The present invention relates generally to manual transmission shifters. More particularly, the invention relates to manual transmission shifters that isolate vibration and maintain continuous perpendicular gripping positions.

BACKGROUND OF THE INVENTION

As illustrated by way of example in FIGS. 1 and 2, practically all manual transmission vehicles (in particular mustangs) have a conventional shifter principle which although may vary in actual specific design pretty much all work identically. The transmission in a car has a linkage that moves the gears inside the transmission in order to operate the vehicle in both forward and reverse. Some cars have 3 speeds, or forward gears. Some have 4, 5 or even 6 forward gears. Regardless, the function is the same. The linkage inside the transmission needs to be manipulated by the driver while seated in the driver's seat. To achieve this a mechanism commonly referred to as a "shifter" is bolted inside the car, which on top has a shift "knob" that the driver grabs to change gears and on bottom has a small ball socket that inserts into the transmission itself. This "shifter" is the only way that the driver can actually place the car in the proper gear to move forward or reverse. All known shifters generally use a pivot ball that basically works much like a seesaw. As the driver pulls back on the shift "knob" the center shaft pivots on a ball which in turn makes the small ball socket pivot in the opposite direction inside the transmission thus "selecting a gear". The distance between the fulcrum, or pivot ball, and the small ball socket determines what is known as the "throw" of the shifter.

Stock shifters and all known aftermarket shifters generally have a solid one-piece center shaft that goes all the way down inside the car into the transmission. Unfortunately, this allows virtually all noise and vibration originating from the transmission, which is known to have a great deal of vibration, to transfer up and thru the shifter center shaft into the shift knob handle, and thereby into the driver's hand. Known factory, or OEM, units utilize a relatively thick rubber gasket on the shift handle as an attempt to muffle this noise. This works adequately, yet such approaches are known to cause the shift handle to flex significantly, and feel very "loose" or "mushy" to the driver when shifting gears. Hence, known aftermarket shifters eliminate this rubber gasket to stiffen the feel of the shift handle but this consequentially removes any noise insulation from the transmission and therefore causes the shifter to buzz and vibrate, often to unacceptable levels.

Known stock shifters feature a bent shift handle that is bent to attempt to move the shift knob position back to the driver for better ergonomics. All other aftermarket shifters use a very similar handle, which may have different bends or heights but basically do the same thing. However, these shifters do not give any adjustments left or right, which can limit the ergonomics for each type of driver. Every person has unique height, weight, arm length, leg length etc. A shifter that is not capable of adjusting left to right, front to back or up and down is usually not able to please every driver. FIG. 1 illustrates handles of a prior-art stock shifter and a popular aftermarket handle. Those skilled in the art will recognize such approaches clearly lack any adjustable positioning. The handle bolts to its shifter in only one place, unlike the handle of the present invention.

The present inventor has designed and brought to market a prior approach, which is comprised of an adjustable handle that uses a 12 mm bolt inside an aluminum housing that attaches to the shift shaft. This handle offers some adjustability because the design bends the bolt about 15 degrees. When rotating the bolt, the handle pivots over to the driver. One significant problem with this prior design is that customers still complain because the shift knob also rotates or "leans" left or back, which makes it uncomfortable when shifting gears. This prior approach, which was designed and marketed by the present applicant, has since product introduction been widely copied by competitors, but none have improved on its design in any significant manner. The present applicant regards this prior design as inferior at least for the foregoing reasons and realized there is a need for an improved solution to this shifting handle problem.

Currently available short throw shifters typically have a fixed distance between the pivot point of the shifter and the connection point between the shifter and the transmission. This results in a fixed throw distance of the shifter. Different drivers have different preferences as to how long the throw of the shifter should be, and this fixed design does not enable a driver to adjust the throw according to his preference. Some solutions exist that provide adaptors that fit to an existing stock shifter to change the throw. However, these solutions require the driver to employ a several adapters of varying lengths to change the throw to the preference of the driver.

In view of the foregoing, there is a need for an improved shifter that dampens the noise and vibration of the transmission. There is also a need for improved methods to enable a shifter to be fully adjustable in various directions to achieve a comfortable driving position and throw for the driver.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates, by way of example, upper shaft piece 350 pressed onto lower shaft piece 330 with lower shaft cap 340 interposed there between;

FIG. 15(a) illustrates shifter assembly in a position of minimum adjustment, and FIG. 15(b) illustrates shifter assembly in a position of maximum adjustment;

Figure 1:
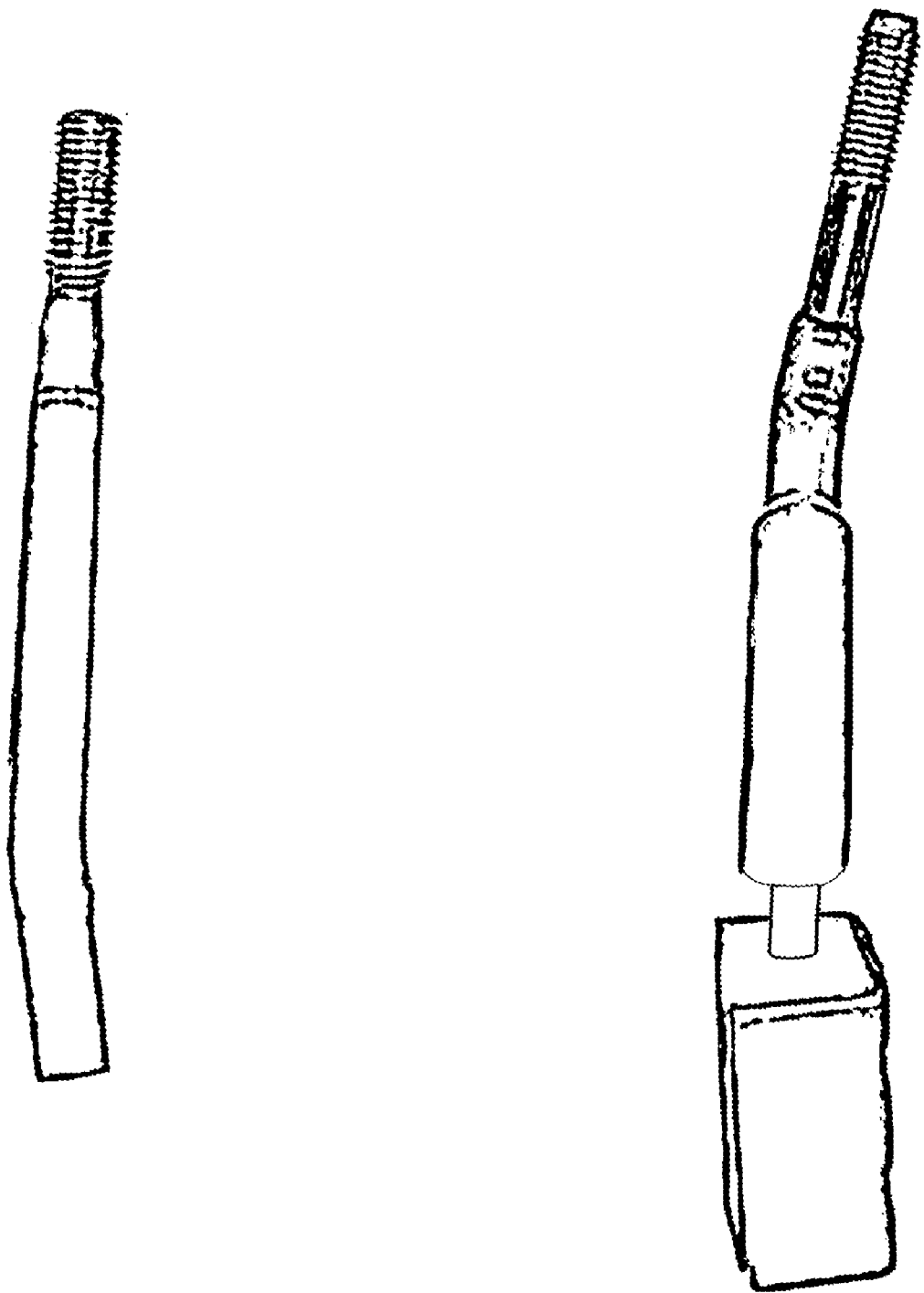
FIGS. 1 and 2 illustrate, by way of example, a side view of some common conventional manual transmission gear shifters.
Figure 2:
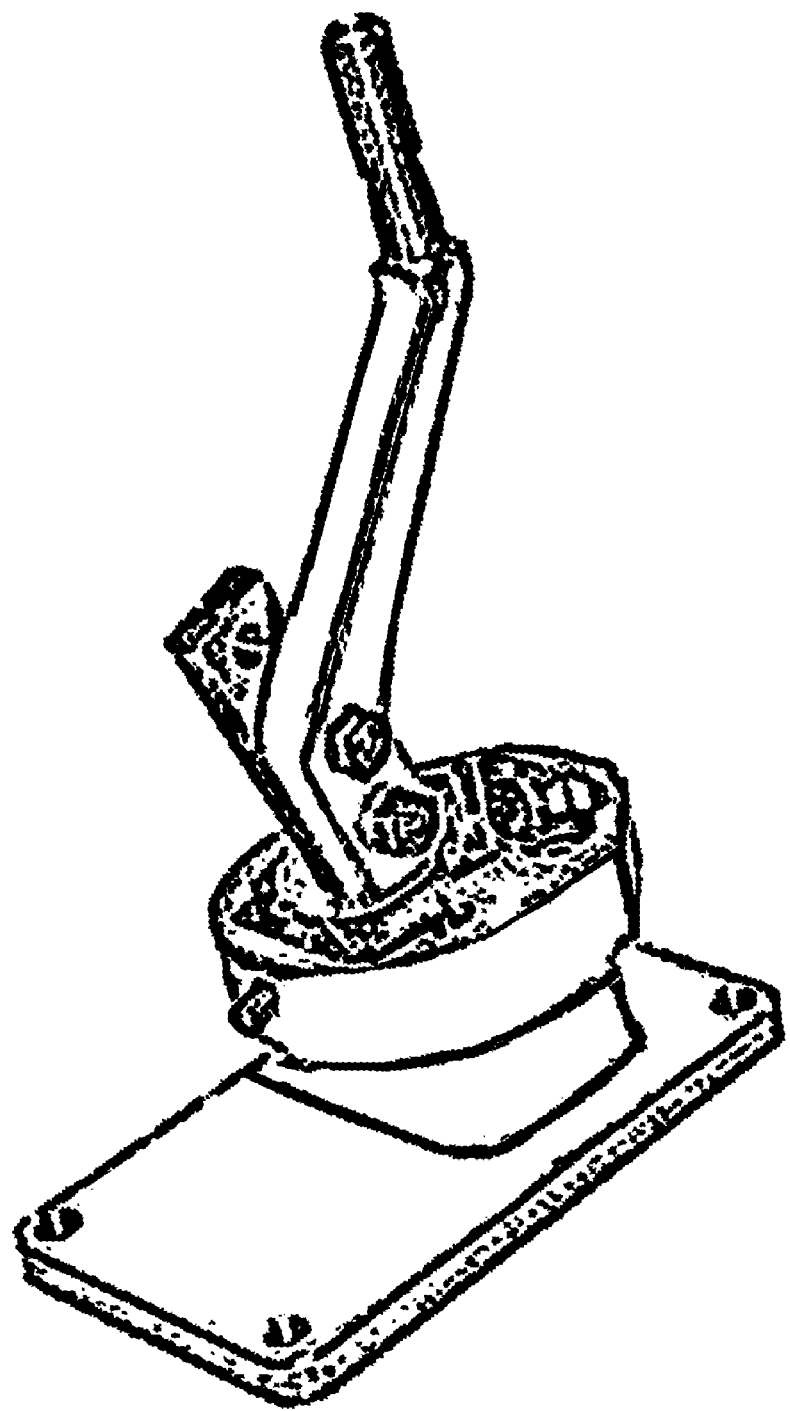

Unless otherwise indicated illustrations in the figures are not necessarily drawn to scale.

SUMMARY OF THE INVENTION

To achieve the forgoing and other objects and in accordance with the purpose of the invention, a variety of manual transmission shifter techniques are described. Some aspects of which include an ergonomic design, noise suppression, adjustable throw, and/or a fully adjustable swivel shift handle.

In one embodiment, an automobile manual transmission shifter is provided, which includes, without limitation, a lower shaft having a lower end portion that is configured to properly interface with a manual automobile transmission and an upper end portion having a mounting boss, a vibration absorbent cap (e.g. made of hardened rubber), the vibration absorbent cap being mounted upon the mounting boss, and configured to dampen at least part of the vibration transmitted from the manual automobile transmission, and an upper shaft having a lower end portion that is configured to properly mate with the vibration absorbent cap, the lower end portion of the upper shaft being joined upon the vibration absorbent cap. In some embodiments, the top of the mounting boss includes, without limitation, a tapped, threaded hole for receiving a shaft joining bolt; and, in some applications, the shaft joining bolt is inserted through the upper shaft from the top thereof and screwed into to the treaded hole of the mounting boss of the lower shaft, thereby fixedly joining the upper shaft to the lower shaft.

In another embodiment, an automobile manual transmission shifter is presented which includes, a shifter shaft having a lower end portion that is configured to properly interface with the manual transmission and an upper end portion being adapted with a means for mounting a shifter handle, and an adjustable swivel shifter handle means for maintaining a continuous perpendicular gripping position while allowing rotational adjustment of the swivel shifter handle means about the shifter shaft, the shifter handle means rotatably joined to the upper end portion. To achieve a continuous rotatable joining to the upper portion of the upper shaft, some embodiments of the shifter handle include a smooth, circular bored hole. To, instead, achieve a step-wise rotatable joining to the upper portion of the upper shaft, some embodiments of the shifter handle include a bored hole that is polygonal shaped. Some embodiments of the shifter handle are further provided with a split collar means for joining the shifter handle to the upper shaft.

In yet another embodiment, an automobile manual transmission shifter is presented which includes a shifter body comprising a pivot point, a shaft extending through the shifter body and attaching to the shifter body at the pivot point, the shaft comprising an upper shaft and a lower shaft, the lower shaft comprising a linkage pivot point at a lower end for connecting to a linkage of the transmission and an adjustable connector attaching to the upper shaft where the distance between the pivot point and the linkage pivot point can be adjusted to vary the throw of the shifter, and means for attaching a shifter handle at a top end of the shaft for operating the shifter.

In a further embodiment, an automobile manual transmission shifter is presented which includes means for retaining a pivot point in a fixed location, means for proving a shaft attached at the pivot point, means for attaching a linkage of the transmission to the shaft, means for adjusting the distance between the pivot point and the linkage to vary the throw of the shifter, and means for attaching a handle to the shaft for operating the shifter. Other embodiments include means for providing vibration dampening and means for an adjustable swivel shifter handle.

In another embodiment, an automobile manual transmission shifter is presented which includes a shifter body comprising a pivot point, a shaft extending through the shifter body and attaching to the shifter body at the pivot point, the shaft comprising an upper shaft and a lower shaft, the lower shaft comprising a linkage pivot point at a lower end for connecting to a linkage of the transmission and an adjustable connector attaching to the upper shaft where the distance between the pivot point and the linkage pivot point can be adjusted to vary the throw of the shifter, a vibration dampening connector disposed in the shaft, the connector dampening at least part of the vibration transmitted from the manual automobile transmission, means for attaching a shifter handle at a top end of the shaft for operating the shifter, and an adjustable swivel shifter handle means for maintaining a continuous perpendicular gripping position while allowing rotational adjustment of the swivel shifter handle means about the shaft, the shifter handle means rotatably joined to the top end.

Yet other embodiments of the present invention are the same as the foregoing embodiments, except these embodiments do not include the noise suppression aspect of the present invention, and, hence, do not include a split shaft design with an interposed vibration absorbent cap.

In yet other embodiments, an automobile manual transmission shifter includes a shifter central shaft means for dampening at least part of the vibration transmitted from the manual automobile transmission; and an adjustable swivel shifter handle means for maintaining a continuous perpendicular gripping position while allowing rotational adjustment of the swivel shifter handle means about the shifter central shaft means.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is illustrated by way of example, and not by way of limitation, in the figures of the accompanying drawings and in which like reference numerals refer to similar elements. The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

Those skilled in the art will recognizes that embodiments of the present invention described below are at least useful to the manual transmission shifter mechanism in the ford mustang and ford cobra vehicles produced between 1990-present. The present invention is contemplated to be applicable to all types of transmissions available in these vehicles both past and present during these years of production (e.g., 1990-present). However, those skilled in the art will moreover appreciate that the present invention more generally applicable to other domestic sports cars such as, by way of example and not limitation, the dodge viper and Chevrolet corvette. Hence, although the embodiments shown and described are directed to mustang implementation examples, the present invention is understood to extend to all suitable applications in accordance with the following teachings.

Aspects of the present invention improve upon the design of a conventional transmission shifter by providing at least the aspects of improved ergonomics, noise suppression, a fully adjustable swivel shift handle, and a shift handle with an adjustable throw suitable for both the stock OEM shifter and aftermarket shifters.

Because it is relatively difficult and costly to retrofit existing shifters to incorporate the ergonomic and noise controlling aspects, the following embodiment does not adapt conventional shifter designs, but instead sets forth a preferred embodiment of the present invention suitable to carry out the principles set forth as follows.

The noise insulating shaft aspect of the present invention will now be described in some detail. In an embodiment of the present invention, the noise and vibration insulation aspect of our shifter is achieved by splitting in two pieces the center linkage shaft that connects the actual transmission down inside the car to the shift knob, which the driver grasps with his hand when shifting gears in the mustang.

Figure 3:
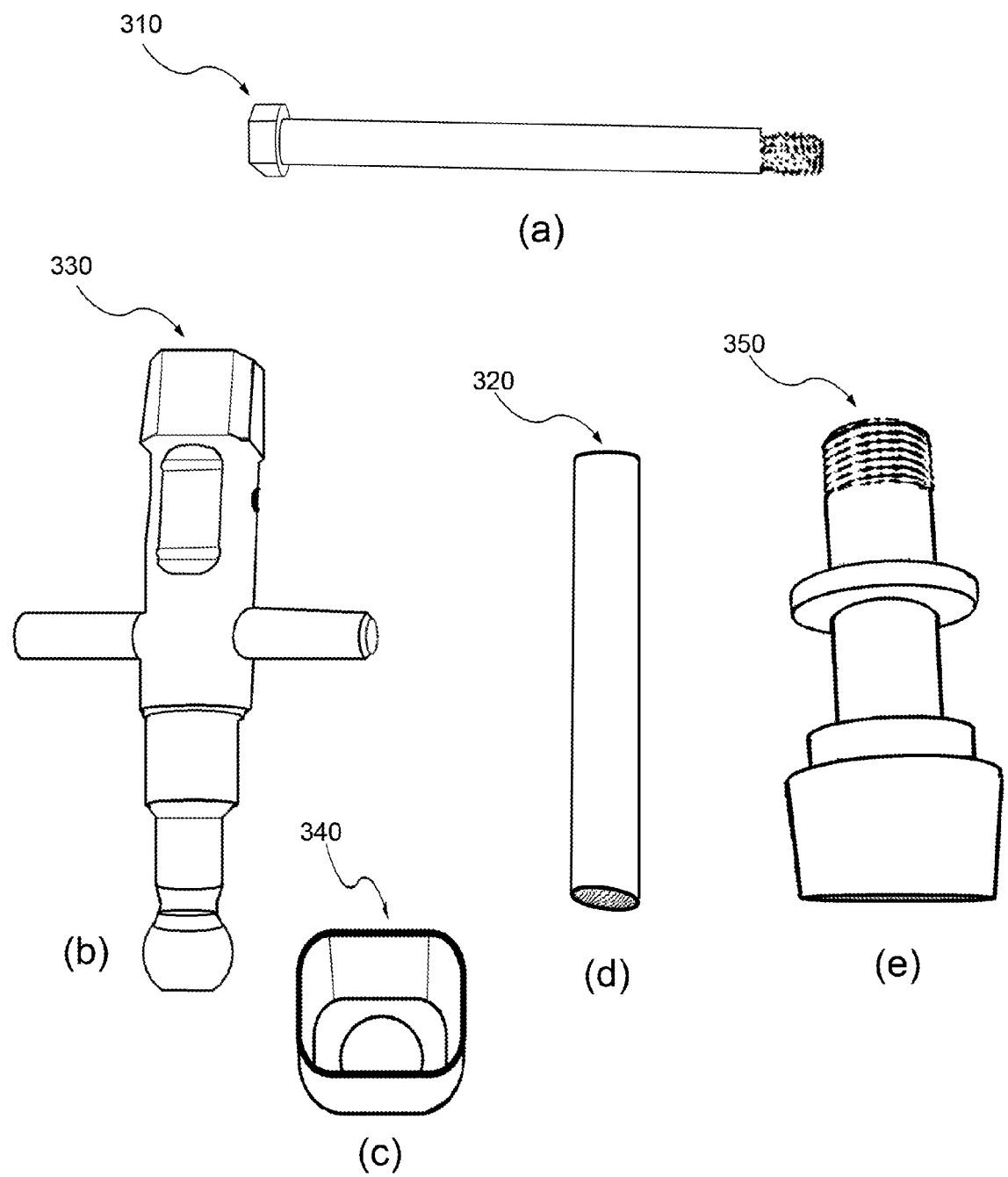
FIG. 3 illustrates, by way of example, the components that are comprised in a center shaft embodiment of the present invention.

FIG. 3 illustrates, by way of example, the components that are comprised in a center shaft embodiment of the present invention. The center shaft embodiment uses five principle components to isolate the lower half of the shaft from the upper half, and thereby remove, or substantially reduce, transmission noise and vibration. It should be appreciated that the design of the present embodiment is such that it does not require the noise thick, isolating rubber used in conventional shifters; hence, the present embodiment does not have the corresponding loose or mushy feel of conventional or stock shifters. The assembly illustrated in FIG. 3 comprises the components as follows. FIG. 3 (a) illustrates a standard shoulder bolt 310 (in the example shown, $3/8$ inch in diameter and 4 inches long). FIG. 3 (d) illustrates a bolt sleeve 320, which may be implemented as a standard rubber tube having an inside diameter sufficient to cover shoulder bolt 310. FIG. 3 (b) illustrates an exemplary lower shaft piece 330, which is actually the part of the present shifter that connects to the car's transmission. FIG. 3 (c) illustrates an exemplary and relatively thin square compliant lower shaft cap 340, which as will be later shown, mates to cover the square top end portion of lower shaft piece 330. Compliant lower shaft cap 340 is preferably made of any relatively stiff, but somewhat compliant material, including, but not limited to common hardened rubber. FIG. 3 (e) illustrates an exemplary upper shaft piece 350, which has a female receiving pocket shaped exactly to snugly receive lower shaft cap 340.

As described in some detail below, the present embodiment may be thought of as taking a solid one-piece shaft, snapping it in half and then reattaching the top and bottom pieces with rubber in between to stop the vibration from traveling up the shaft. By doing this along the centerline instead of with a side-mounted handle as included in a stock factory shifter, noise can be drastically reduced, if not effectively eliminated without a "rubbery" sloppy feel to the shifter handle as is the case in conventional approaches. FIGS. 2 through 5 illustrate the components and progressive assembly steps towards making a shaft assembly in accordance with an embodiment of the present invention.

The five components shown in FIG. 3 are assembled to make the center shifter shaft of a shifter in accordance with the center shaft embodiment of the present invention. The steps to assemble the shown components are relatively simple. In general, a first step is to slide lower shaft cap 340 onto a square-machined boss on lower shaft piece 330. A second step is to join the "lower" half of the center shaft and the "upper" half together with lower shaft cap 340 sandwiched in between, and the halves of the center shaft are screwed together with shoulder bolt 310 to make the unit one piece again such that there is no "metal to metal" contact between the upper and lower shaft pieces. When joining the upper and lower shaft halves together, the female pocket of upper shaft piece 350, which is the same shape as the upper shaft cap, is pressed down onto the lower shaft/cap subassembly.

Figure 4:
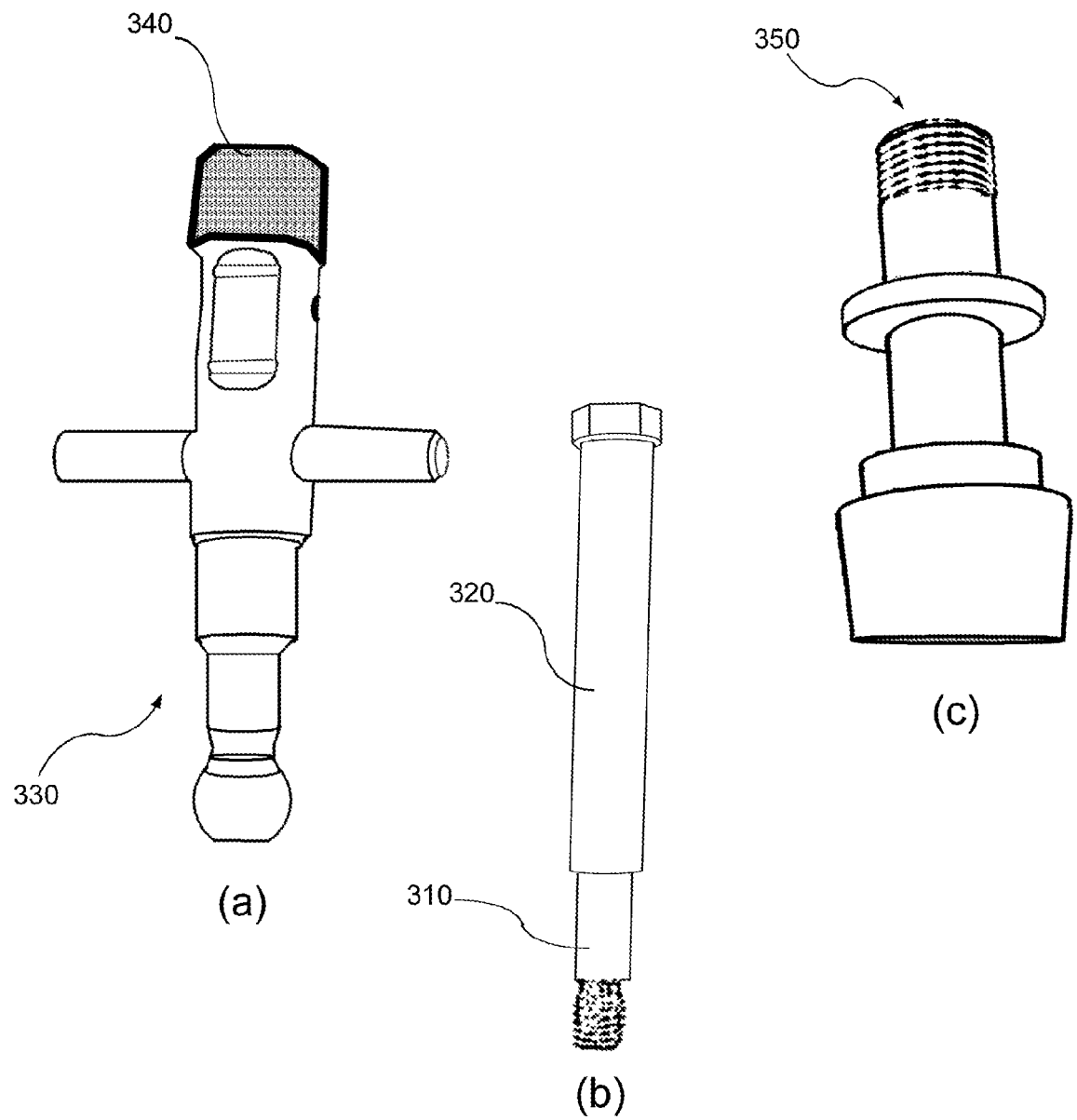
FIG. 4 illustrates, by way of example, the state of the components after the first step in assembling the center shaft.

FIG. 4 illustrates, by way of example, the state of the center shaft embodiment components after the first step in assembling the center shaft. FIG. 4a illustrates lower shaft cap 340 being pressed onto the square boss of lower shaft piece 330. FIG. 4b illustrates bolt sleeve 320 being applied over shoulder bolt 310. Bolt sleeve 320 is constructed of a relatively stiff yet compliant material such as, but not limited to, hardened rubber.

In one aspect, bolt sleeve 320 is slid onto shoulder bolt 310 to insulate shoulder bolt 310 from the upper shaft. Those skilled in the art, in light of the present teachings, will recognize the appropriate selection and configuration of bolt sleeve 320. Although as suitable dimensions will work, in the present example, bolt sleeve 320 has a $3/8$-inch inside diameter and a half-inch outside diameter to properly fit inside upper shaft piece 350.

Figure 5:
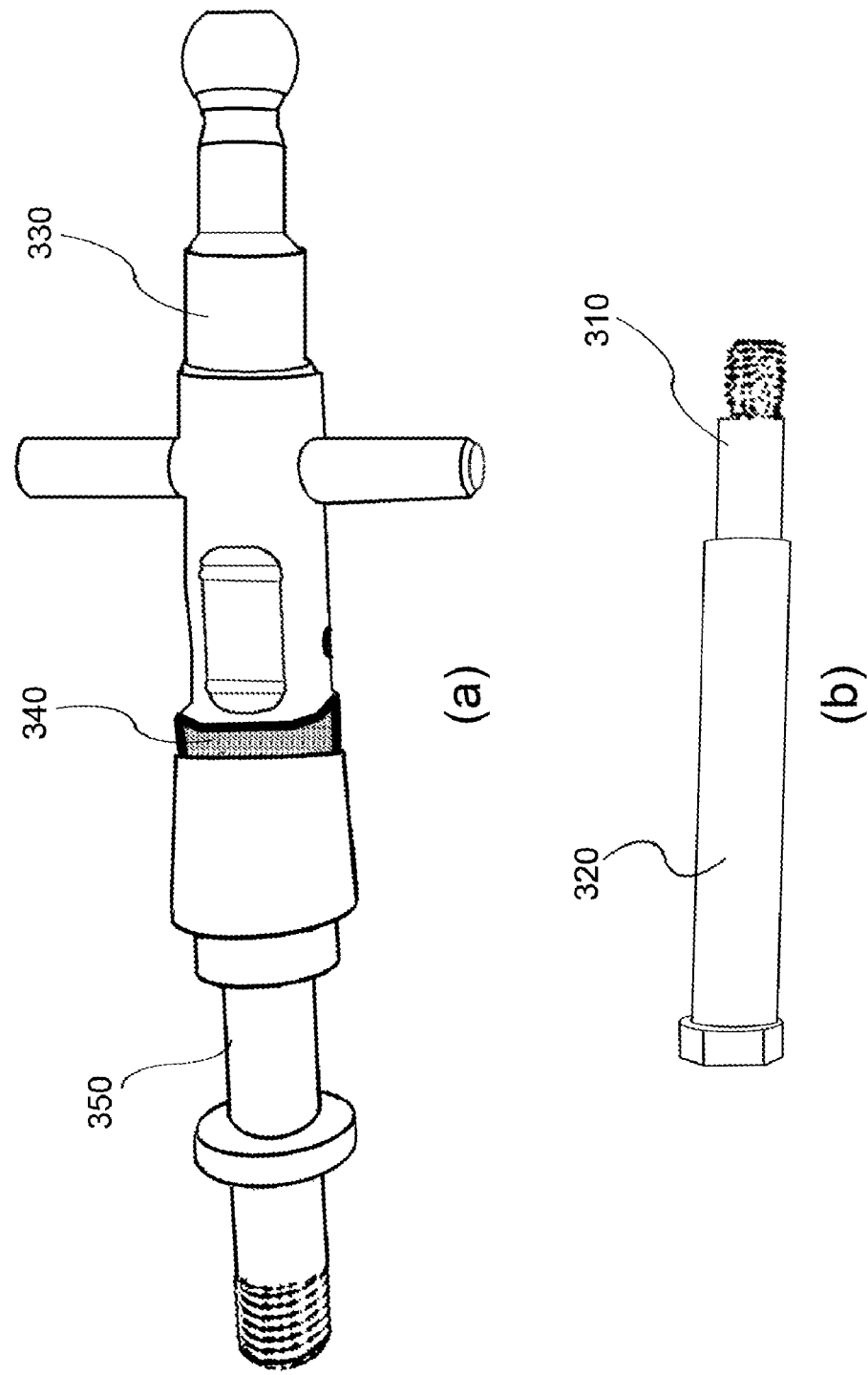

FIG. 5 illustrates, by way of example, upper shaft piece 350 pressed onto lower shaft piece 330 with lower shaft cap 340 interposed there between. FIG. 5 also illustrates, by way of example, shoulder bolt 310 inserted into bolt sleeve 320.

Figure 6:
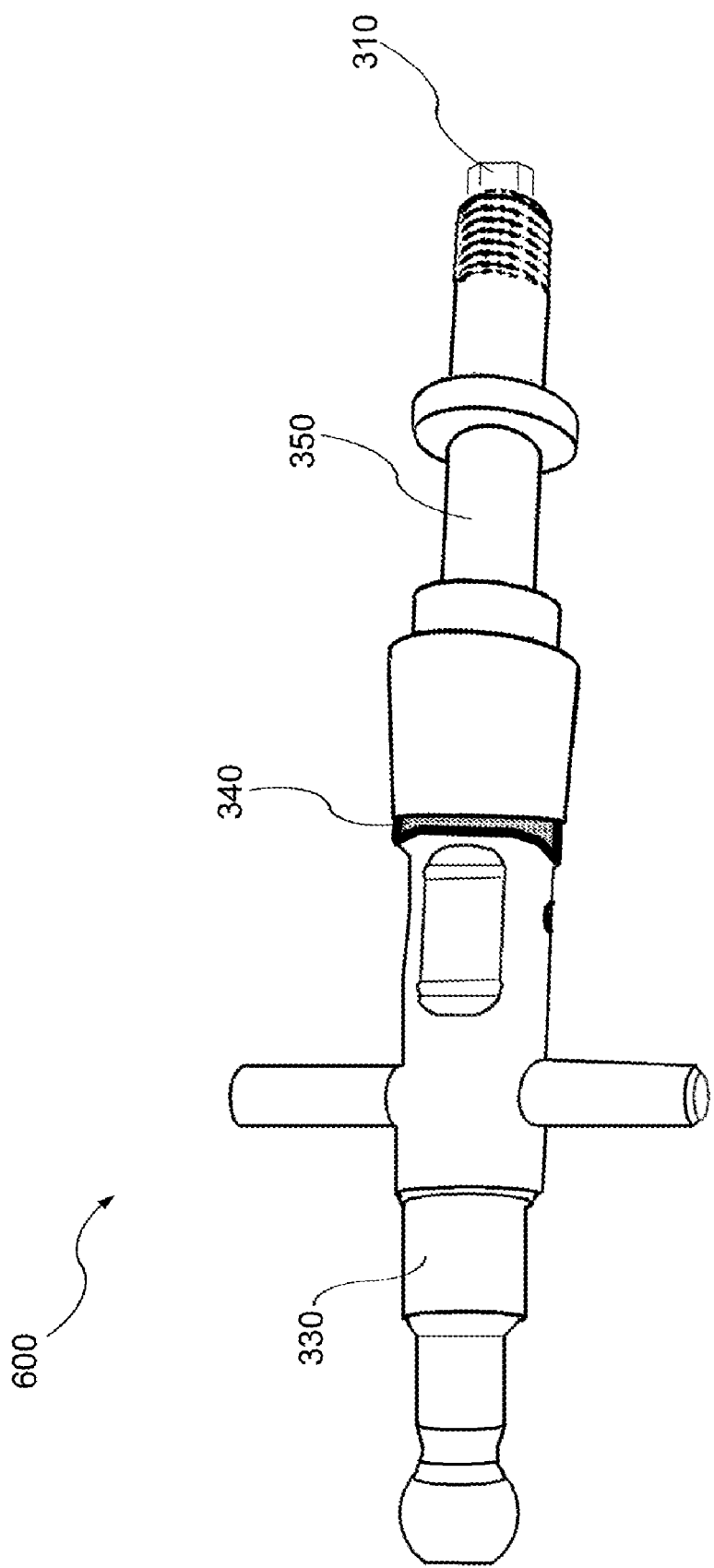
FIG. 6 illustrates, by way of example, the completed center shaft according to a center shaft embodiment of the present invention.

FIG. 6 illustrates, by way of example, the insertion of shoulder bolt 310 and bolt sleeve 320 (hidden within upper shaft piece 350) into a central hole down the middle of upper shaft piece 350 where shoulder bolt 310 is screwed into the top, center of the square boss of lower shaft piece 330. Shoulder bolt 310 is sufficiently tightened to rigidly hold all of the shown pieces into one relatively rigid structure, thereby completing a center shaft structure 600. Center shaft 600 is suitable for use in a shifter mechanism similar to conventional shifters for similar applications.

Alternate methods of manufacturing the insulating shaft aspect of the present invention will now be described in some detail. Center shaft 600 utilizes the components shown in FIGS. 2-5, however, the teachings and spirit of the present invention allows several alternative techniques that may or may not be included depending upon the needs of the particular application. For example, without limitation, some application may not require the noise isolation aspect of the present invention and correspondingly may not include lower shaft cap 340, which acts to isolate the upper and lower shaft to prevent, or at least substantially reduce, the transmission of vibration and noise from reaching the cockpit of the automobile. It should be appreciated that the noise isolation aspect of the present invention is more generally applicable to other domestic sports cars such as, by way of example and not limitation, the dodge viper and Chevrolet corvette.

Those skilled in the art, in light of the present teachings, will readily recognize a multiplicity of alternative embodiments and assembly techniques of the components that comprise center shaft 600. By way of example, and not limitation, some exemplary implementation details and variations follow. For example, without limitation, some embodiments of lower shaft cap 340 may not be configured or otherwise shaped exactly as shown. That is, some manufacturers may choose to use larger or smaller diameter shafts and rubber pieces, or change the material from hardened rubber to, for example, without limitation, a plastic polymer or other suitable conventional materials if these materials prove effective in adequately isolating the upper and lower shaft components from each other along the centerline to, thereby, maintain the lateral rigidity of center shaft 600. By way of further example, in some alternative embodiments of center shaft 600, shoulder bolt 310 and/or bolt sleeve 320 may be eliminated by making lower shaft piece 330 with built in shaft (possibly dimensioned similar to shoulder bolt 310) above the square boss where lower shaft cap 340 mounts. Such alternative embodiments of the present invention may use any known means for retaining the upper shaft; for example, without limitation, by simply using a c-clip or set screw cap to hold the upper shaft onto the lower shaft. However, the shaft bolt/sleeve configuration of the center shaft embodiment shown is, at least in some applications, known to be useful for its strength and tight dimensional tolerances. It should be further appreciated that the particular choice of structural materials in the forgoing embodiment is not contemplated to be central or critical to the function or teachings of the present invention. Hence, the material selected for any of the foregoing components may be suitably substituted as required by the needs of the particular application. For example, without limitation, although the material used in the foregoing embodiments is stainless steel, other embodiments may, instead, use carbon steel or even titanium, or any other suitable material that will be readily apparent to those skilled in the art.

A fully adjustable swivel shift handle aspect of the present invention will now be described in some detail. It should be noted that depending upon the needs of the particular application, embodiments of the insulating shaft aspect of the present invention may be implemented independently of the present fully adjustable swivel shift handle aspect or in combination therewith. Many different design attempts to achieve a higher performance shift handle were made by the present applicant before arriving at an optimal reach and comfort as well as an optimal knob angle and position as will be discussed in the context of the following exemplary shift handle embodiments.

Figure 7:
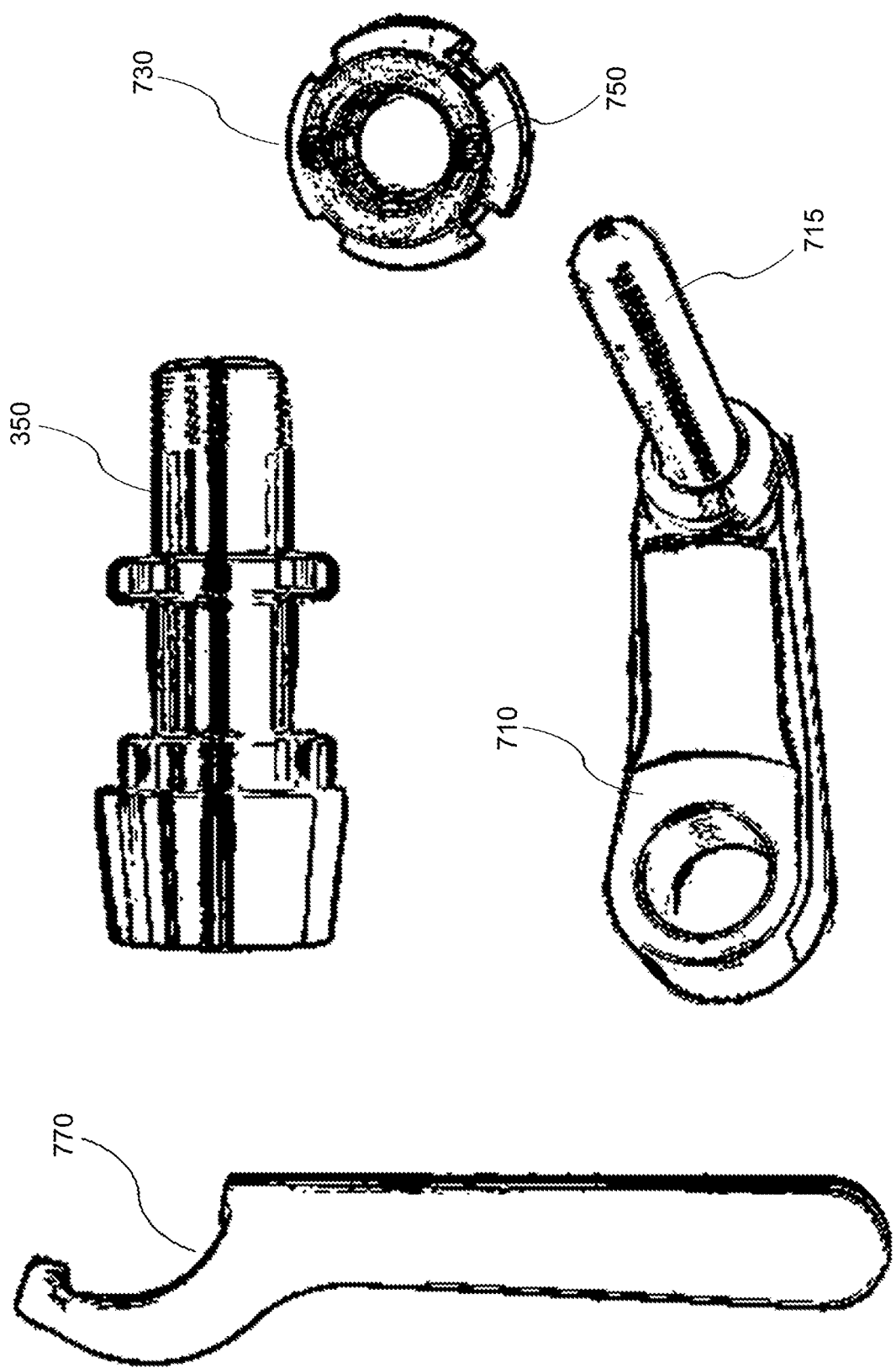
FIG. 7 illustrates by way of example the assembly components to make a shifter handle according to a first handle embodiment of the present invention.

FIG. 7 illustrates by way of example the assembly components to make a shifter handle according to a first handle embodiment of the present invention. Upper shaft piece 350, or the handle-mounting end of the shifter center shaft, is provided with a proper lathe turned top end (e.g., with a ¾"-16 thread). To achieve a continuous rotational freedom of adjustment, a shifter handle 710 is bored with a relatively smooth hole wide enough to slide onto the threaded end of upper shaft piece 350 without too much play (e.g., a ¾" so that the handle may easily drop down onto the center shaft). Shifter handle 710 is further provided with a shifter knob 715, which the driver grips to control the position of the present shifter assembly. Then, a spanner lock nut 730 (e.g., with matching ¾" threads) is screwed down onto the threaded end of upper shaft piece 350 and tightened up to, but just before, contacting shifter handle 710, thereby vertically constraining shifter handle 710 into position, but allowing shifter handle 710 to freely rotate on the horizontal plane, thereby permitting the driver to find the most comfortable position for driving. After the driver finds the most comfortable position for shifter handle 710, spanner lock nut 730 is tightened further to hold shifter handle 710 in place while driving. Optional spanner locking screw(s) 750 (e.g., two are 10-32 screws) may be disposed about spanner lock nut 730 to further resist against rotational loosening of spanner lock nut 730, and thereby further assure the locking into place of shifter handle 710. That is, locking screw(s) 750 are simply an added precaution to avoid the loosening of shifter handle 710 during operation.

To assemble the adjustable shifter handle embodiment, shifter handle 710 is first slid onto the threaded end of upper shaft piece 350, and then spanner lock nut 730 is screwed on top of shifter handle 710 and vertically constrained. A spanner wrench 770, or any other suitable tool, may be used to tighten spanner lock nut 730 onto the top half of the shifter center shaft. If implemented, locking screws 750 are then screwed into place. The top half of the center shifter shaft is shown for reference only. In this way, shifter handle 710 is rigidly mated to the upper end of center shaft 600 in a relatively simple manner.

Figure 8:
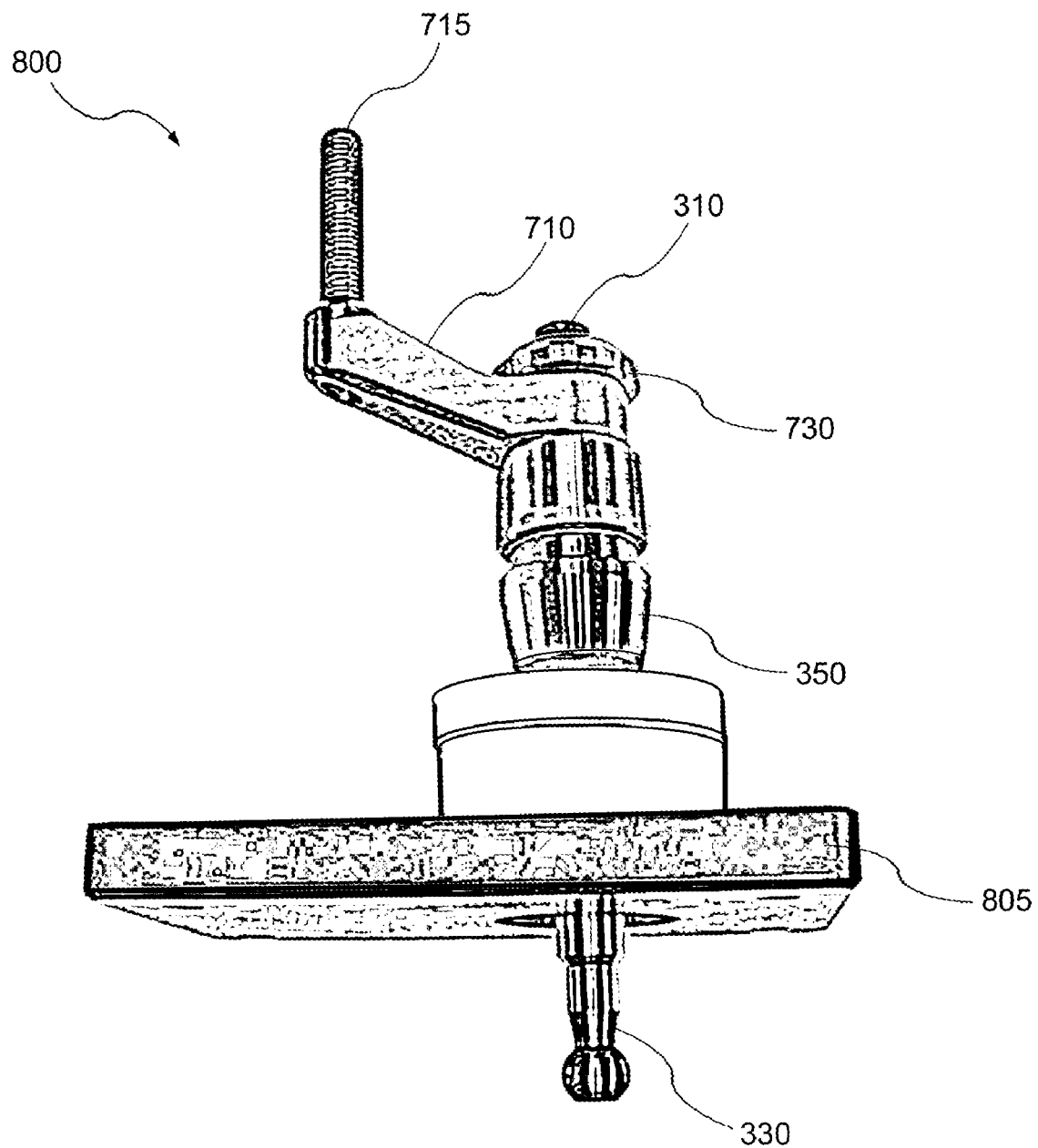
FIG. 8 illustrates by way of example, a side view of a completed, fully adjustable shifter installed in a typical application, in accordance with an embodiment of the present invention.

FIG. 8 illustrates by way of example, a completed, fully adjustable swivel shifter 800 installed in an exemplary shifter mount 805, in accordance with the first embodiment of the present invention. As those skilled in the art will appreciate, one attendant aspect of the embodiment shown is that shifter handle 710 may be pivoted 360 degrees in rotation to enable the driver to achieve the optimal shifter handle angle adjustment for the given shifter position, thereby providing the driver a near infinite set of adjustment positions without substantially changing the angle or height of shift knob 715 in any way. Given that conventional shifter handles can only adjust the shifter knob location by changes the angle of the shifter knob (which is very undesired), users of embodiments of the present invention will appreciated that the present embodiment provides the operator the ability to change the shifter knob position while keeping the shifter knob relatively straight up and perpendicular to level ground.

Figure 9:
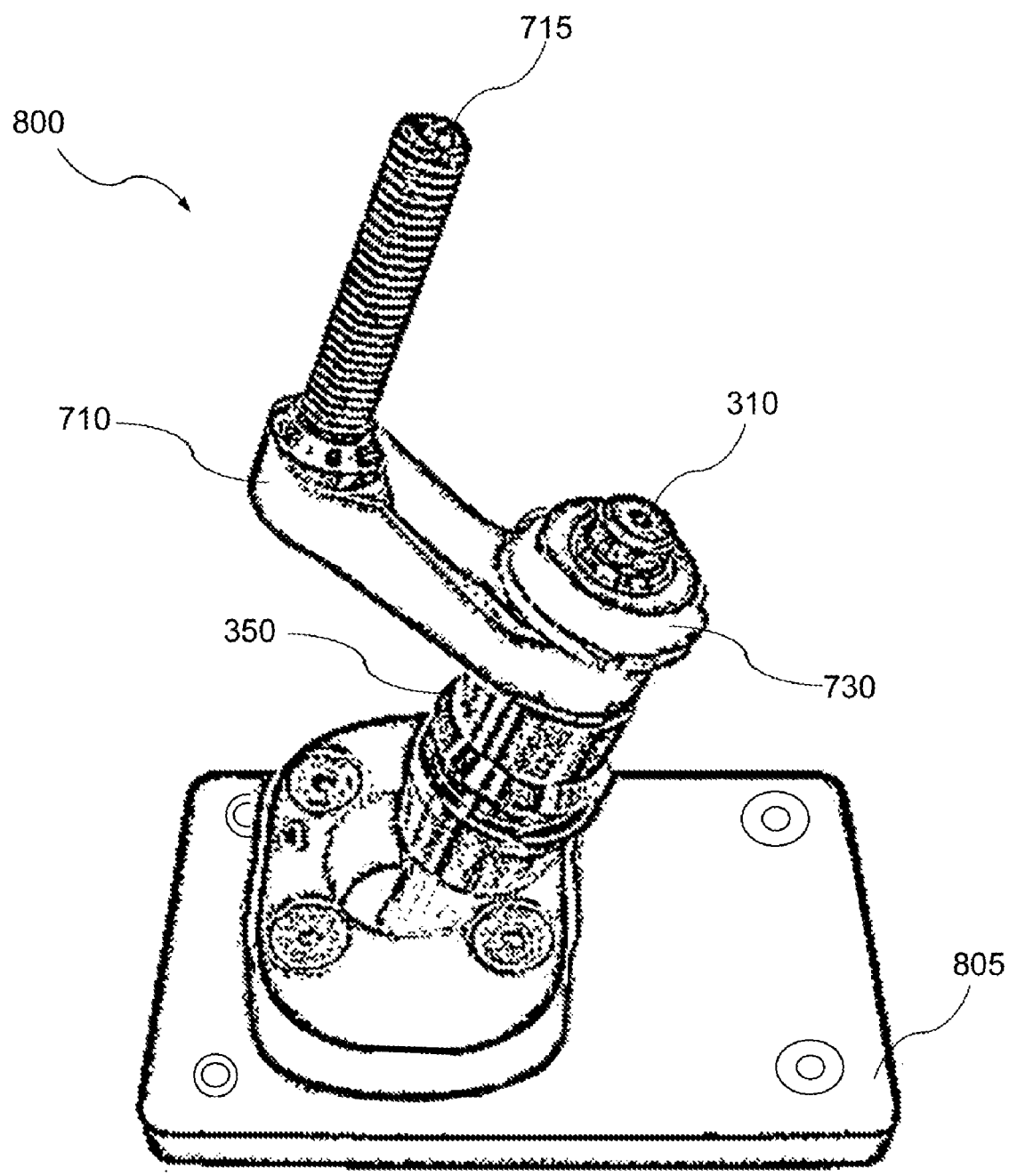
FIG. 9 illustrates by way of example a top perspective view showing how the embodiment of FIG. 8 has the full degree of freedom required to shift gears.

Of course, those skilled in the art, in light of the present teachings, will recognize a multiplicity of alternative ways that fully adjustable swivel shifter 800 may be embodied, manufactured, and assembled beyond the examples shown. Those skilled in the art will, moreover, appreciate that the fully adjustable swivel shift handle aspect is more generally applicable to other domestic sports cars such as, by way of example and not limitation, the dodge viper and Chevrolet corvette. FIG. 9 illustrates by way of example a top perspective view showing how the embodiment of FIG. 8 has the full degree of freedom required to shift gears. As shown, the present embodiment enables the user to maintain a continuous, substantially perpendicular gripping position while allowing 360-degree rotational adjustment.

Those skilled in the art, in light of the present teachings, will readily recognize a multiplicity of alternative embodiments and assembly techniques of the components the comprise center shaft 600. By way of example, and not limitation, some exemplary implementation variations, alternate embodiments and methods of manufacturing the present adjustable handle aspect of the instant invention will be set forth. For example, without limitation, some embodiments of the present adjustable swivel shifter may replace spanner lock nut 730 with shifter handle alternate retaining means, including without limitation, a simple set of screws tapped into the sides of the shifter handle and then screwed onto the mounting location of the upper shaft thereby clamping the shifter handle thereupon. Although, this alternate embodiment eliminates the need for the spanning lock nut, there is additional risk of marring the upper shaft mounting location over time. In yet other embodiments of the present adjustable swivel shifter, instead of the shifter handle being attached to the upper shaft piece (as in the first embodiment), the shifter handle may be attached to the side of the upper shaft with bolts, whereby the swivel base becomes an extra component to the shifter assembly. Yet other embodiments of the present invention are contemplated wherein the shifter handle may not be provided with full rotational travel positioning, but, instead, be fixed in place, by, for example, a polygonal shaped bore in the handle (instead of a smooth bore as in the first embodiment) that allows the handle to only be located in stepped positions according to the polygon sides. It should be appreciated that such stepped position embodiments of the present adjustable swivel shift handle still work on the same basic design principle of first embodiment, and still use rotational adjustments instead of angular or "bending" of the shifter handle.

Figure 10:
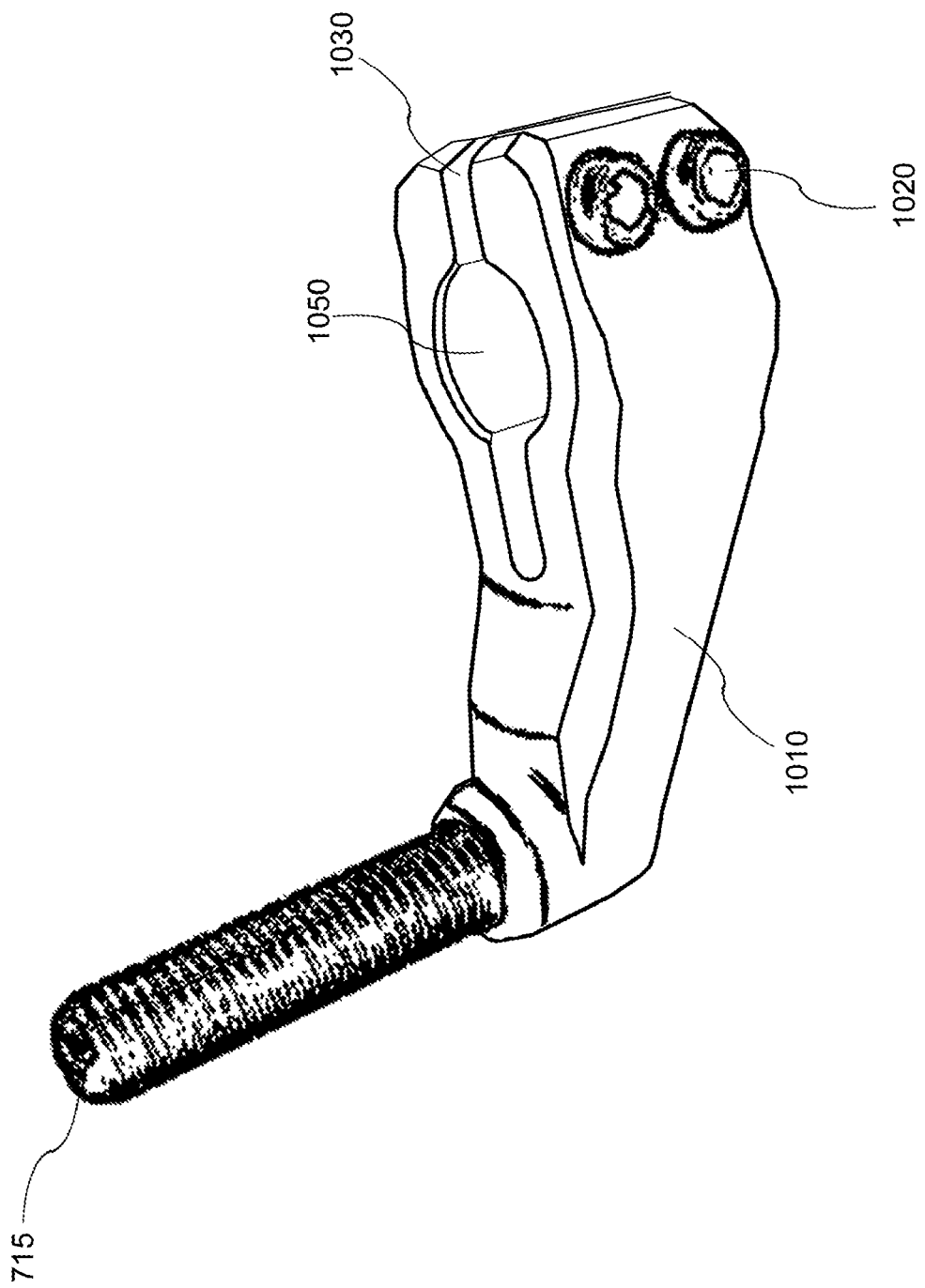
FIG. 10 illustrates by way of example a left side perspective view of a shifter handle according to a second shifter embodiment of the present invention.
Figure 11:
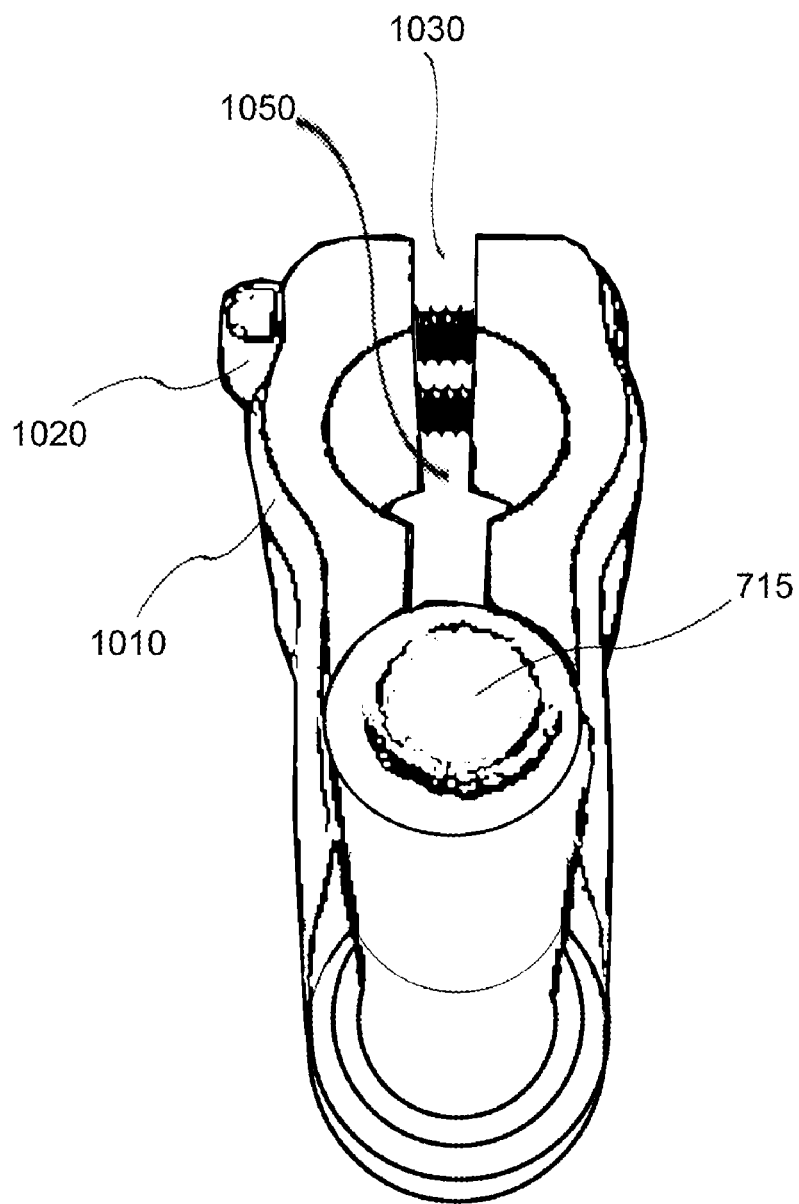
FIG. 11 illustrates by way of example a top perspective view of the split collar shifter handle shown in FIG. 10.
Figure 12:
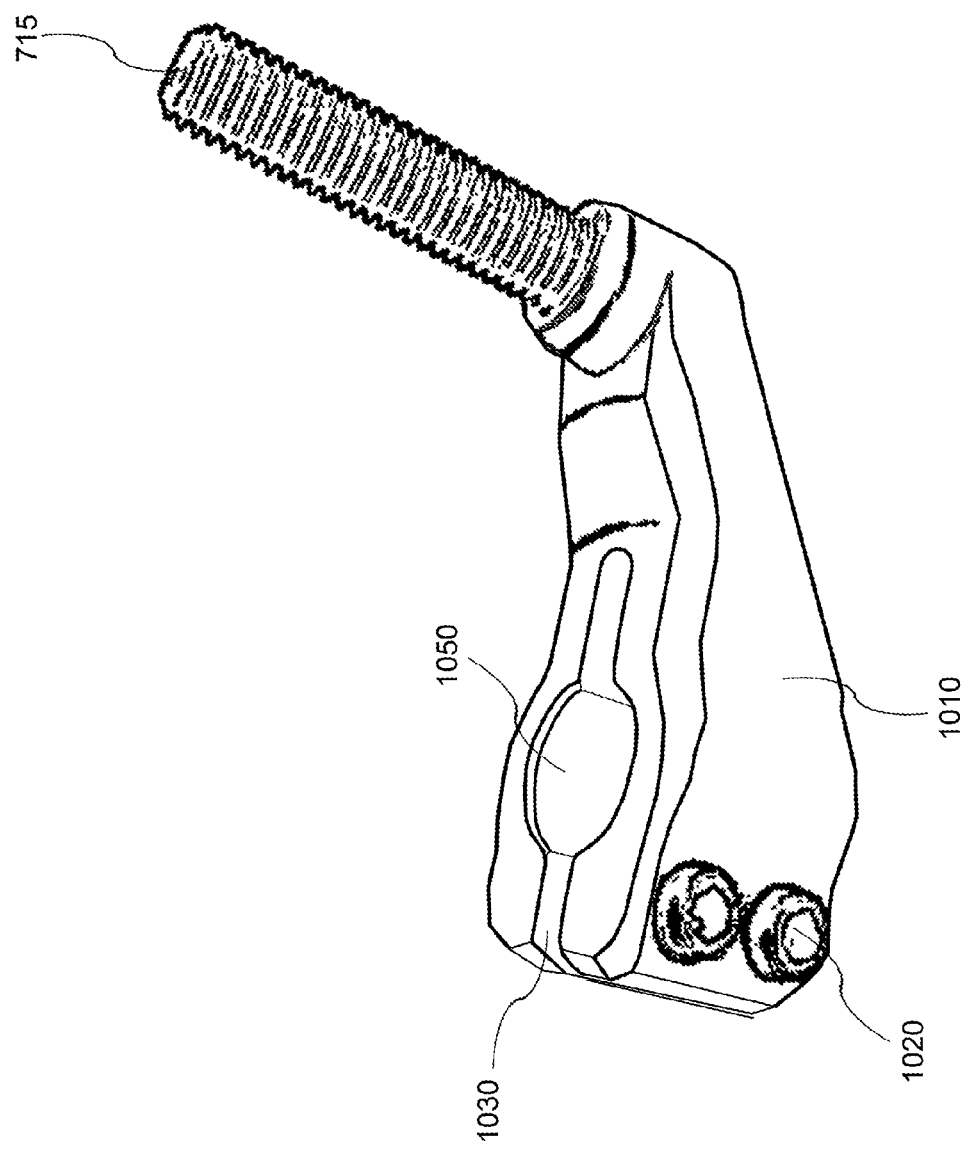
FIG. 12 illustrates by way of example a left side perspective view of the split collar shifter handle shown in FIG. 10.

FIG. 10 illustrates by way of example a left side perspective view of a shifter handle 1010 according to a second embodiment of the present invention. The second embodiment is substantially the same as the first embodiment, except that the mounting design of the shifting handle is modified according to a conventional "split collar" approach, very similar to how a mountain bike handlebar is clamped to the bike frame. In the second embodiment shown, shifter handle 1010 is tightened onto the upper shaft piece mounting location by tightening shifter handle mounting bolts 1020 to close a split color gap 1030, thereby making an upper shaft mounting hole 1050 the desired diameter to sufficiently grip onto the upper shaft (not shown). In many applications, an attendant aspect of the present split collar design is that it is relatively easier to install and adjust and generally holds the handle position better than the foregoing bored-hole embodiment. FIG. 11 illustrates by way of example a top perspective view of the split collar shifter handle of FIG. 10. FIG. 12 illustrates by way of example a left side perspective view of the split collar shifter handle shown in FIG. 10.

Alternative embodiments of the present invention are also contemplated that may retrofit existing aftermarket shifters and stock shifters to include the fully adjustable swivel shift handle aspect of the present invention. Yet other alternative embodiments of the present invention may only implement the fully adjustable swivel shift handle aspect of the present invention, and not the noise suppression aspect thereof, wherein the center shaft is similar to conventional center shafts (i.e., not split in half with a noise absorbent material interposed in between) except the upper end of the center shaft is adapted as described above to operably interface with the adjustable swivel shifter handle of the present invention.

An adjustable throw aspect of the present invention will now be described in some detail. It should be noted that depending upon the needs of the particular application, embodiments of the insulating shaft and/or adjustable swivel shift handle aspects of the present invention may be implemented independently of the present adjustable throw aspect or in combination therewith. In an embodiment of the present invention, the adjustable throw aspect of the shifter is achieved by providing a two-piece center shaft connecting the pivot point of the shifter handle, where the shifter handle meets the shifter body, and a pivot bracket that connects the center shaft to the transmission of the vehicle.

Figure 13:
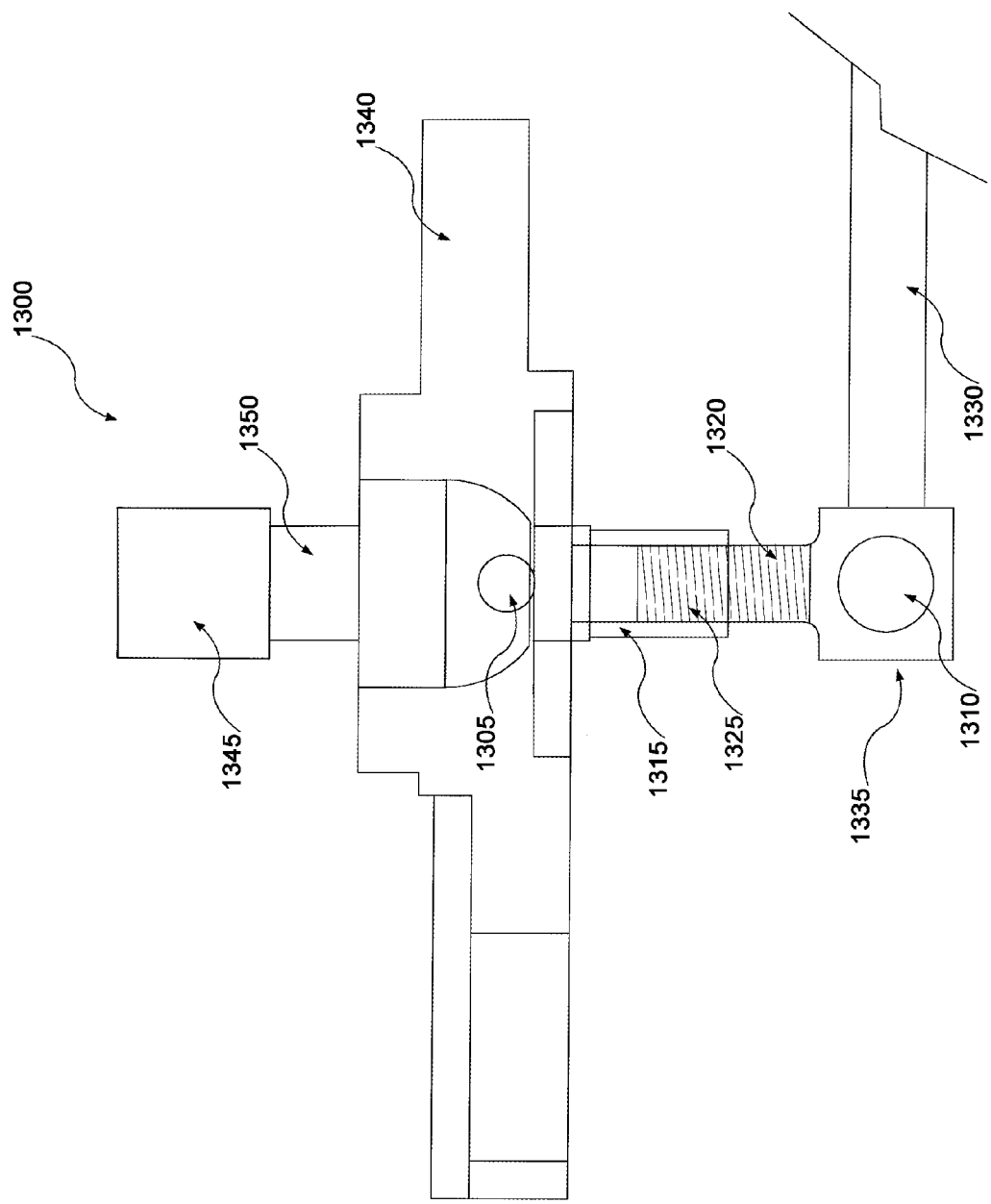
FIG. 13 illustrates an exemplary shifter assembly 1300 that enables the throw of the shifter to be adjusted, in accordance with an embodiment of the present invention.

FIG. 13 illustrates an exemplary shifter assembly 1300 that enables the throw of the shifter to be adjusted, in accordance with an embodiment of the present invention. The present embodiment enables the throw to be adjusted by varying the distance between a pivot point 1305 of the shifter and a pivot point 1310 as the throw of the shifter is determined by this distance. This is accomplished by providing a shaft that is comprised of two pieces, an upper shaft 1315 and a lower shaft 1320 instead of a one-piece shaft of fixed length. Lower shaft 1320 has a threaded boss that may be threaded into a threaded lower portion 1325 of upper shaft 1315 enabling pivot point 1310 to move up and down in relation to pivot point 1305.

Lower shaft 1320 is connects to the transmission of the car at pivot point 1310 through a linkage rod 1330. A pivot bracket 1335 connects pivot point 1310 to linkage rod 1330. Pivot point 1305 pivots with respect to a shifter body 1340. A shift knob handle 1345 attaches to the top of a center shaft 1350. The driver grasps shift knob handle 1345 when operating the shifter. Shift knob handle 1345 provides more comfort to the driver's hand when operating the shifter than would be provided by center shaft 1350 alone. Those skilled in the art, in light of the present teachings, will recognize that shift knob handle 1345 may be coupled to center shaft 1350 through various means, such as, but not limited to, sliding on to the shaft, a set screw or screws, or screwing on to the shaft with threaded portions on the end of the shaft and the interior of the shift knob handle.

To incorporate the fully adjustable swivel shift handle aspect to the present embodiment, a swivel shift handle, for example, without limitation, shift handle 710 as shown in FIG. 7, may be attached to the top of center shaft 1350 instead of a conventional shift knob handle. In an embodiment incorporating a swivel shift handle, the top of center shaft 1350 may be threaded so that a spanner lock nut and optional spanner locking screws may be screwed on to center shaft 1350 to secure the swivel shift handle. Those skilled in the art, in light of the present teachings, will recognize that various alternate means for securing the swivel shift handle may be employed such as, but not limited to, various different types of bolts, a pin, or a snap-on cap that locks into the top of center shaft 1350 and into the swivel shift handle.

To incorporate the noise and vibration suppression aspect previously described into the present embodiment, center shaft 1350 comprises noise and vibration suppression components similar to those shown by way of example in FIGS. 2-5 housed in center shaft 600 shown in FIG. 6. These components may include, without limitation, a shaft cap and a bolt sleeve constructed of a relatively stiff but somewhat compliant material such as, but not limited to, hardened rubber or plastic.

Figure 14:
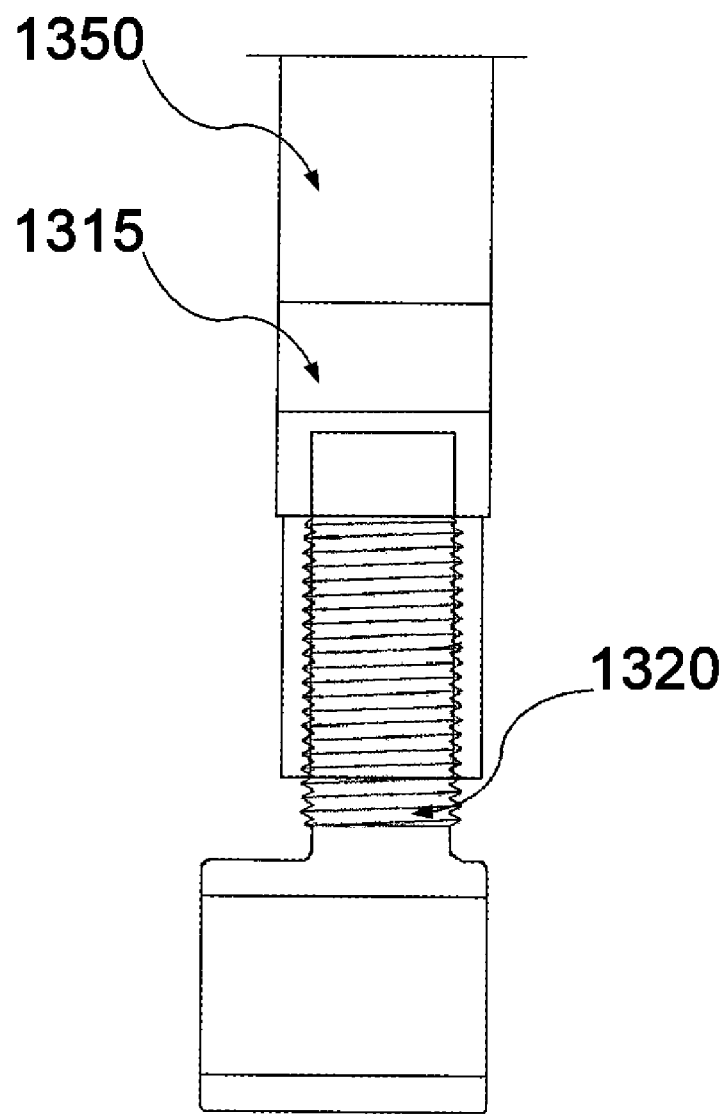
FIG. 14 illustrates, by way of example, upper shaft 1315 and lower shaft 1320 of shifter assembly 1300, in accordance with an embodiment of the present invention.

FIG. 14 illustrates, by way of example, upper shaft 1315 and lower shaft 1320 of shifter assembly 1300, in accordance with an embodiment of the present invention. The threaded boss of lower shaft 1320 is threaded into the bottom of upper shaft 1315. The deeper lower shaft 1320 is threaded into upper shaft 1315 the longer the shift throw is. To shorten the shift throw, lower shaft 1320 is unthreaded from upper shaft 1315 until the desired length is achieved.

Figure 15A:
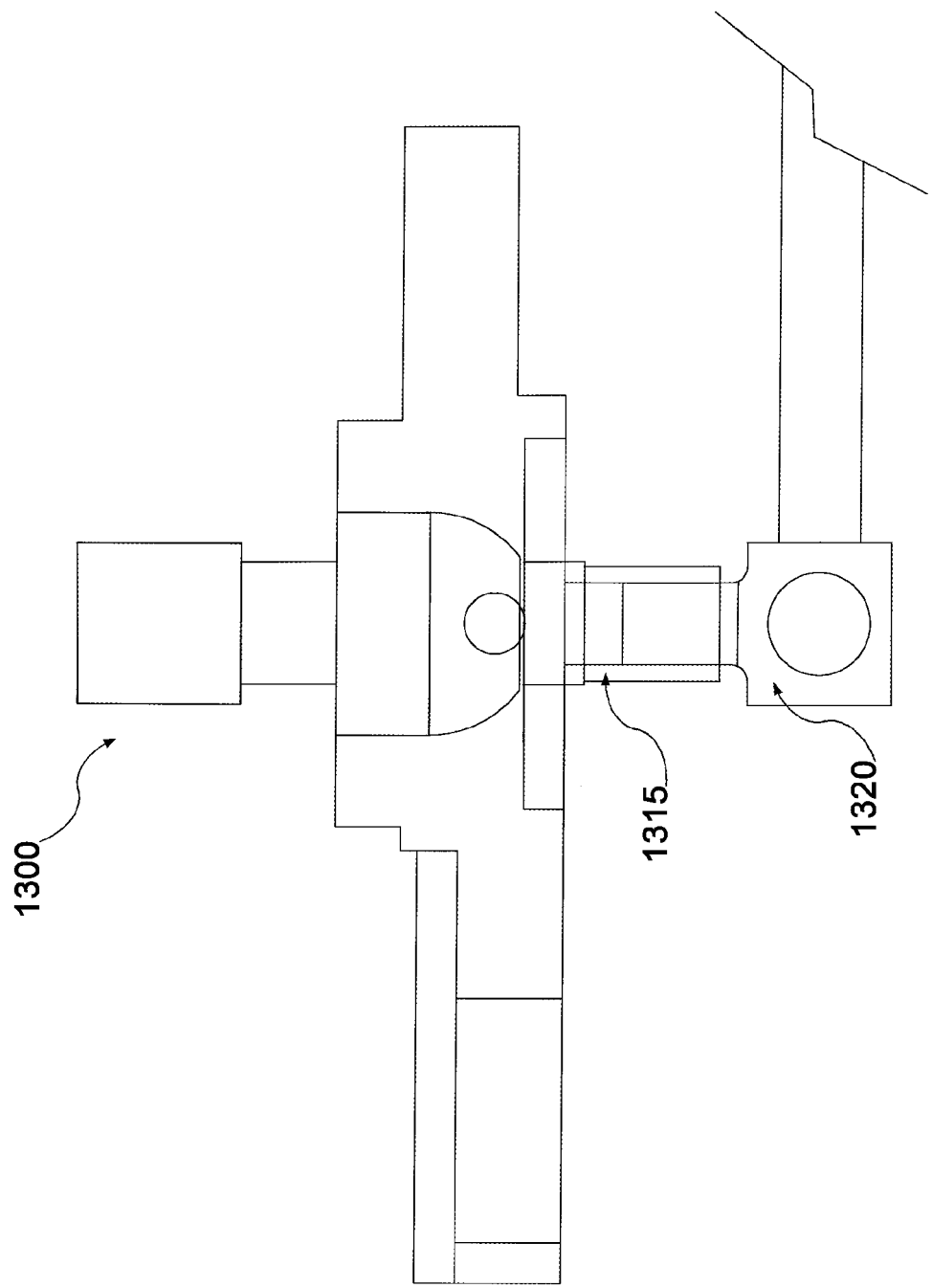
FIGS. 15(a) and 15(b) illustrate an exemplary adjustable shifter assembly 1300 in two different positions, in accordance with an embodiment of the present invention.
Figure 15B:
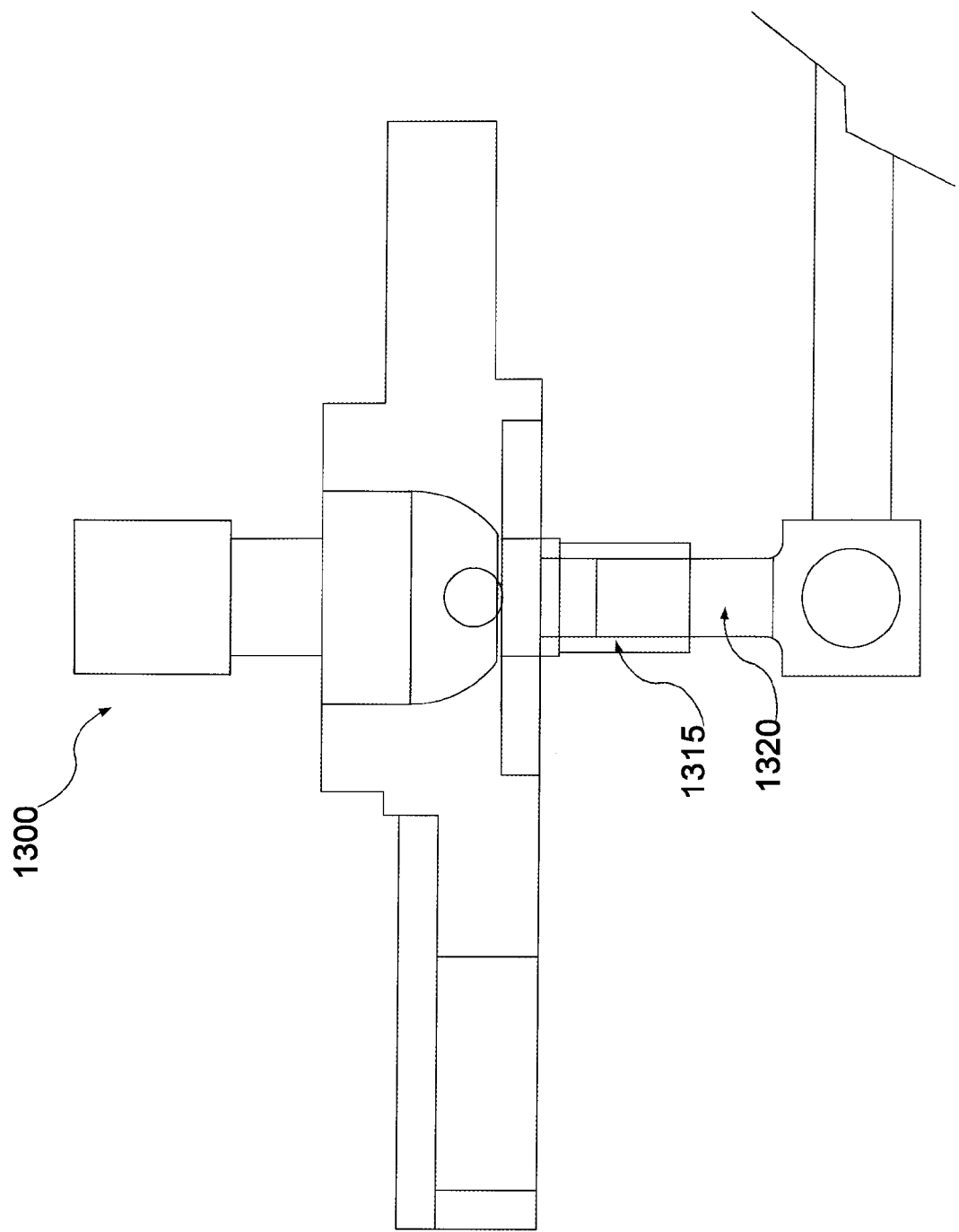

FIGS. 15(a) and 15(b) illustrate an exemplary adjustable shifter assembly 1300 in two different positions, in accordance with an embodiment of the present invention. FIG. 15(a) illustrates shifter assembly in a position of minimum adjustment, and FIG. 15(b) illustrates shifter assembly in a position of maximum adjustment. FIG. 15(a) illustrates shifter assembly 1300 positioned with a shift throw roughly equal to that of the stock, or OEM, shifter. In this minimum adjustment position, lower shaft 1320 is fully screwed into upper shaft 1315. FIG. 15(b) illustrates shifter assembly 1300 extended to the range limit resulting in a fifty percent reduction in shift throw. In this maximum adjustment position, lower shaft 1320 is not fully screwed into upper shaft 1315. The threaded design of the present embodiment offers a large amount of flexibility in adjustability because this design provides a near infinite number of positions between the maximum and minimum positions.

Those skilled in the art will recognize that there is a practical limit to how much the throw may be reduced before the mechanical leverage of the shifter is reduced to the point that the shifter is difficult to shift and thus undesirable in practical applications. The consensus in the automobile industry concerning short throw shifters is that the reduction in throw should be no more than fifty percent of the original throw or these undesirable results will occur. Therefore, as shown by way of example in FIGS. 15(a) and 15(b), the present embodiment is able to be adjusted in a range with a minimum of what is roughly the same as the stock, or OEM, shifter and a maximum of roughly a fifty percent reduction in shift throw. However, depending on the application, there may be instances where a throw reduction of more than fifty percent may be suitable. For these applications embodiments may be provided that allow for a throw reduction greater than fifty percent by lengthening the threaded portions of upper shaft 1315 and lower shaft 1320 and, in some embodiments, by lengthening the shafts as well.

Alternate methods of manufacturing the adjustable throw aspect of the present invention will now be described in some detail. Those skilled in the art, in light of the present teachings, will readily recognize a multiplicity of alternative embodiments and assembly techniques of the components that comprise shifter assembly 1300. By way of example, and not limitation, some exemplary implementation details and variations follow. For example, without limitation, in some embodiments, center shaft 1350, upper shaft 1315 and lower shaft 1320 may not be configured or otherwise shaped exactly as shown. For example, without limitation, some manufacturers may choose to use larger or smaller diameter shafts or may choose to thread upper shaft 1315 into lower shaft 1320. Also, alternate embodiments may use various means for adjusting the distance between pivot points 1305 and 1310, and some exemplary embodiments incorporating various different means for adjusting this distance are described in more detail below. By way of further example, some alternative embodiments may employ various different means for coupling lower shaft 1320 to linkage rod 1330 other than pivot bracket 1335. For example, without limitation, some embodiments may use means such as, but not limited to, a ball and socket joint or a simple hinged joint to connect lower shaft 1320 to linkage rod 1330 provided the means for connection enables the motion of lower shaft 1320 to sufficiently control the motion of linkage rod 1330 to select the correct gears.

It should be further appreciated that the particular choice of structural materials in the forgoing embodiment is not contemplated to be central or critical to the function or teachings of the present invention. Hence, the material selected for any of the foregoing components may be suitably substituted as required by the needs of the particular application. For example, without limitation, although the material used in the foregoing embodiment is stainless steel, other embodiments may, instead, use carbon steel or even titanium, or any other suitable material that will be readily apparent to those skilled in the art.

Figure 16:
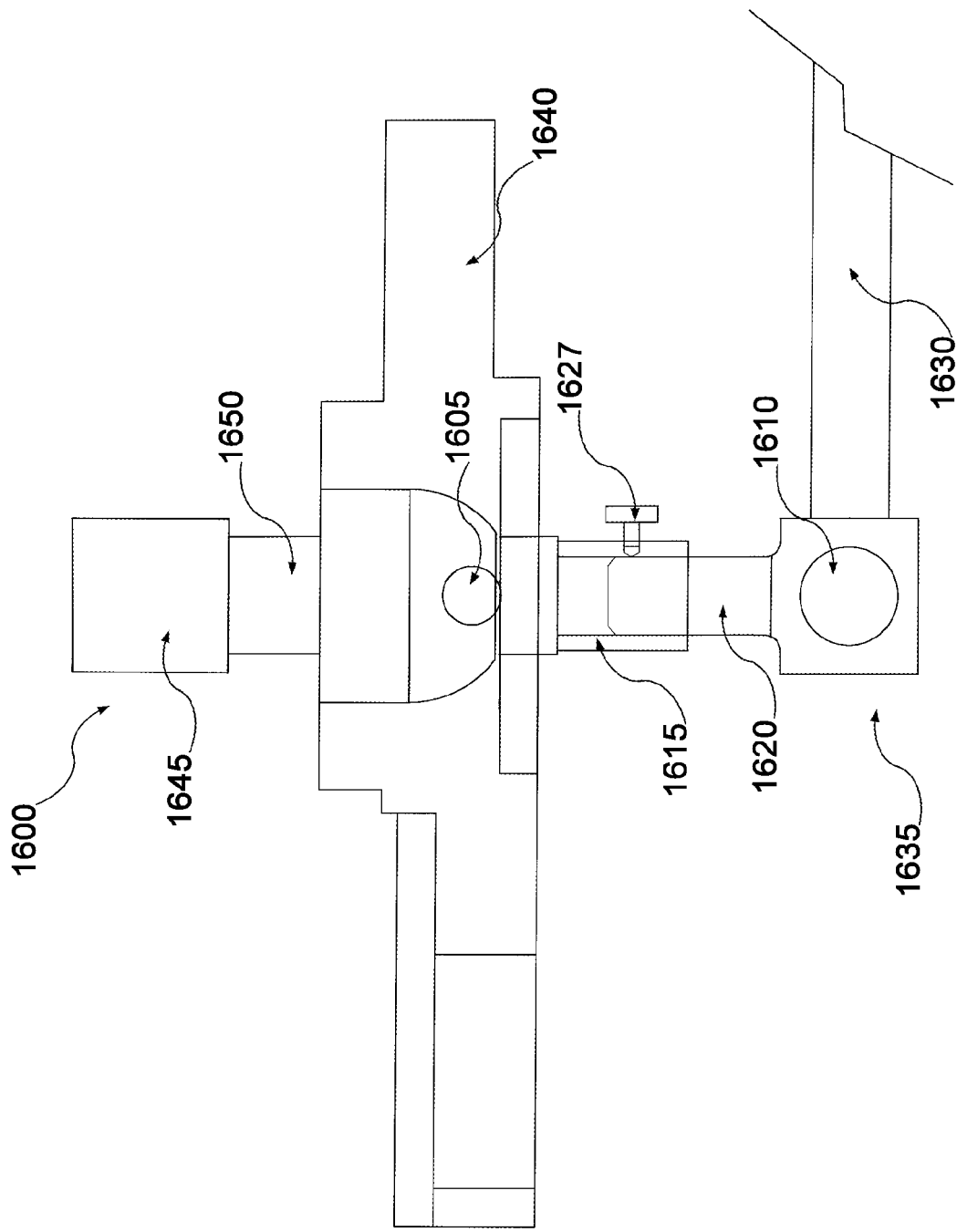
FIG. 16 illustrates an exemplary shifter assembly 1600 with an adjustable throw, in accordance with an embodiment of the present invention.

FIG. 16 illustrates an exemplary shifter assembly 1600 with an adjustable throw, in accordance with an embodiment of the present invention. The present embodiment comprises an upper shaft 1615 and a lower shaft 1620. Lower shaft 1620 is a male post with a smooth bore that is inserted into a hole with a smooth bore in upper shaft 1615. To adjust the distance between a pivot point 1605 and a pivot point 1610, lower shaft 1620 slides in and out of upper shaft 1615, and a lock screw 1627 locks lower shaft 1620 in place.

As in the embodiment shown by way of example in FIG. 13, lower shaft 1620 is coupled to the transmission at pivot point 1610 through a linkage rod 1630, and linkage rod 1630 is attached to lower shaft 1620 with a pivot bracket 1635. Also, as in the embodiment shown in FIG. 13, pivot point 1605 pivots with respect to a shifter body 1640, and a shift knob handle 1645 may be attached to the top of center shaft 1650. This sliding adjustment method allows for a near infinite number of available positions between the minimum and maximum extension. However, the present embodiment has the possibility of upper shaft 1615 and lower shaft 1620 slipping against each other or pulling apart.

As described in reference to FIG. 13, a fully adjustable swivel handle may be incorporated into the design by attaching a swivel shift handle to center shaft 1650 instead of a conventional shift knob handle. Also, as previously described, the noise and vibration suppression aspect of the present invention may be incorporated into center shaft 1650 by including components such as, but not limited to, a shaft cap and a bolt sleeve, as shown by way of example in FIGS. 2-5, into center shaft 1650.

Figure 17:
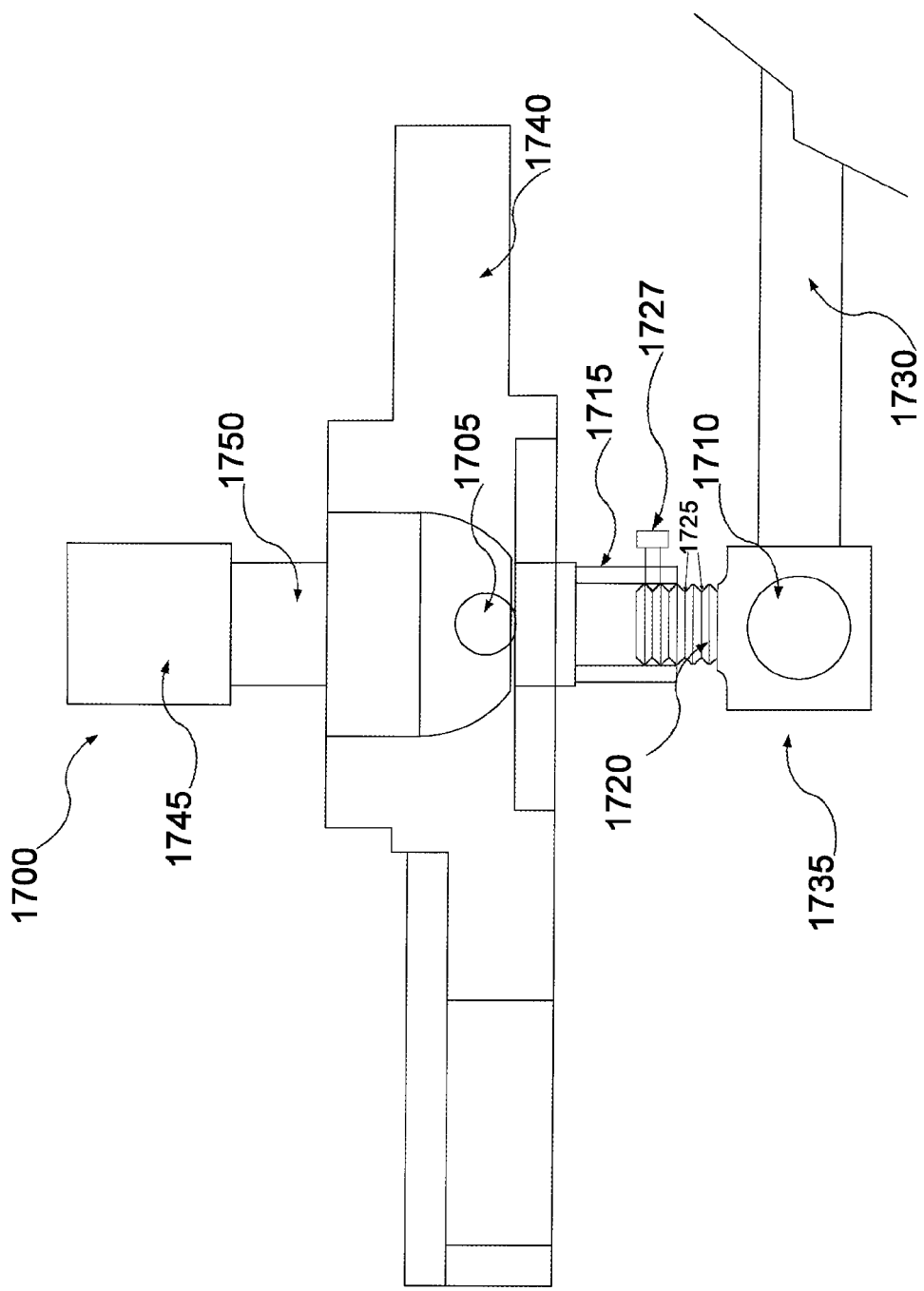
FIG. 17 illustrates an exemplary shifter assembly 1700 with an adjustable throw, in accordance with an embodiment of the present invention.

FIG. 17 illustrates an exemplary shifter assembly 1700 with an adjustable throw, in accordance with an embodiment of the present invention. The present embodiment comprises an upper shaft 1715 and a lower shaft 1720. Lower shaft 1720 is a post with machined grooves 1725 at stepped distances that is inserted into a hole with a smooth bore in upper shaft 1715. To adjust the distance between a pivot point 1705 and a pivot point 1710, lower shaft 1720 slides in and out of upper shaft 1715, and a lock screw 1727 locks lower shaft 1720 in place by being tightened into one of the machined grooves 1725. In the present embodiment machined grooves 1725 are "V" shaped. However, in alternate embodiments, these machined grooves may be various different shapes such as, but not limited to, square grooves or round grooves, and these grooves may be various different sizes to vary the adjustability of the throw.

As in the embodiment shown by way of example in FIG. 13, lower shaft 1720 is coupled to the transmission at pivot point 1710 through a linkage rod 1730, and linkage rod 1730 is attached to lower shaft 1720 with a pivot bracket 1735.

Also, as in the embodiment shown in FIG. 13, pivot point 1705 pivots with respect to a shifter body 1740, and a shift knob handle 1745 may be attached to the top of center shaft 1750. This adjustment method does not allow for an infinite number of available positions between the minimum and maximum extension. However, the present embodiment may provide much flexibility in adjustment depending on the number and size of machined grooves 1725.

As described in reference to FIG. 13, a fully adjustable swivel handle may be incorporated into the design by attaching a swivel shift handle to center shaft 1750 instead of a conventional shift knob handle. Also, as previously described, the noise and vibration suppression aspect of the present invention may be incorporated into center shaft 1750 by including components such as, but not limited to, a shaft cap and a bolt sleeve, as shown by way of example in FIGS. 2-5, into center shaft 1750.

In yet another embodiment the adjustment of the upper shaft and the lower shaft may be achieved by including holes in the lower shaft and a hole in the upper shaft. In this embodiment, the lower shaft slides in and out of the upper shaft until a hole in the lower shaft at the desired length matches up with the hole in the upper shaft. Then a screw is placed through the holes to hold the lower shaft in place. Those skilled in the art, in light of the present teachings, will recognize that various alternate means may be used to hold the lower shaft in place such as, but not limited to, a pin or a smooth rod. The present embodiment does not provide an infinite amount of positions between the maximum and minimum adjustments; however, depending on the size and number of holes provided in the lower shaft, a large amount of flexibility in adjustability may be achieved.

FIGS. 16 and 17 illustrate upper shafts and lower shafts as cylindrical in shape. However, in embodiments such as these where the upper shaft and the lower shaft are slidably connected rather than threaded together, the upper shaft and lower shaft may have cross sections of different shapes such as, but not limited to, squares, rectangles, triangles, or other polygons. Shafts constructed of square tubing may be beneficial in an embodiment employing a lock screw to secure the lower shaft into the upper shaft, as shown by way of example in FIG. 16, because the square shape limits the ability of the lower shaft of rotating within the upper shaft, which may occur with cylindrical shafts.

Alternative embodiments of the present invention are also contemplated that may retrofit existing aftermarket shifters and stock shifters to include the adjustable throw aspect of the present invention. Some embodiments of the present invention incorporate all of the aspects previously described, the noise and vibration suppression aspect, the adjustable swivel shift handle aspect, and the adjustable throw aspect. Other embodiments may incorporate only one of these aspects, and yet other embodiments incorporate various combinations of two of these aspects. For example, without limitation, one embodiment may incorporate the adjustable throw aspect and the adjustable swivel shift handle without the noise and vibration suppression aspect. Other embodiments may incorporate the noise and vibration suppression aspect with only one of the adjustment aspects, either the swivel shift handle aspect or the adjustable throw aspect.

Having fully described at least one embodiment of the present invention, other equivalent or alternative methods of implementing manual transmission shifters according to the present invention will be apparent to those skilled in the art. For example, without limitation, the above embodiments have been described as being incorporated into a sports car. However, some embodiments may incorporate aspects of the present invention into different types of vehicles such as, but not limited to, larger cars or trucks. For example, without limitation, the noise and vibration suppression aspect may be very desirable in a truck because of the tendency for truck cabs to be somewhat noisy. The invention has been described above by way of illustration, and the specific embodiments disclosed are not intended to limit the invention to the particular forms disclosed. The invention is thus to cover all modifications, equivalents, and alternatives falling within the spirit and scope of the following claims.

I claim:

1. An automobile manual transmission shifter comprising:
a lower shaft having a lower end portion that is configured to interface with the manual transmission, an upper end portion having a mounting boss, a pivot point for the automobile manual transmission shifter and means for adjusting the distance between said pivot point and said interface with the manual transmission to vary the throw of the automobile manual transmission shifter;
a vibration absorbent cap, said vibration absorbent cap being mounted upon said mounting boss, and configured to dampen at least part of the vibration transmitted from the manual automobile transmission; and
an upper shaft having a lower end portion that is configured to mate with said vibration absorbent cap, said lower end portion of said upper shaft being joined upon said vibration absorbent cap.

2. The manual transmission shifter of claim 1, wherein said vibration absorbent cap is made of hardened rubber.

3. The manual transmission shifter of claim 1, wherein the top of said mounting boss comprises a tapped, threaded hole for receiving a shaft joining bolt.

4. The manual transmission shifter of claim 3, wherein the shaft joining bolt is inserted through said upper shaft from the top thereof and screwed into said treaded hole of said mounting boss of said lower shaft, thereby fixedly joining said upper shaft to said lower shaft.

5. An automobile manual transmission shifter comprising:
a shifter shaft having a lower end portion that is configured to interface with the manual transmission and an upper end portion being adapted with a means for mounting a shifter handle; and
a shifter handle being configured to maintain a continuous perpendicular gripping position with respect to a substantially horizontal plane, while allowing rotational adjustment of said shifter handle about a vertical symmetry axis of said shifter shaft in said horizontal plane, said shifter handle being rotatably joined to said upper end portion.

6. The manual transmission shifter of claim 5, wherein said shifter handle comprises a smooth, circular bored hole that is used for the continuous rotatable joining to said upper end portion.

7. The manual transmission shifter of claim 5, wherein said shifter handle comprises a bored hole that is polygonal shaped and used for the step-wise rotatable joining to said upper end portion.

8. The manual transmission shifter of claim 5, wherein said shifter handle comprises a split collar being configured for joining to said upper end portion.

9. An automobile manual transmission shifter comprising:
a shifter body comprising a pivot point;
a shaft extending through said shifter body and joining to said shifter body at said pivot point, said shaft comprising an upper shaft and a lower shaft, said lower shaft comprising a linkage pivot point at a lower end for connecting to a linkage of the transmission and an adjustable connector joining said upper shaft to said lower shaft wherein the distance between said pivot point and said linkage pivot point is adjusted to vary the throw of the shifter; and means for joining a shifter handle at a top end of said shaft for operating the shifter.

10. The manual transmission shifter of claim 9, in which said adjustable connector comprises a boss for insertion into said upper shaft.

11. The manual transmission shifter of claim 10, in which said boss and said upper shaft are threaded.

12. The manual transmission shifter of claim 10, in which said adjustable connector comprises a lock screw for securing the connection.

13. The manual transmission shifter of claim 12, in which said boss comprises machined grooves.

14. An automobile manual transmission shifter comprising:

means for retaining a pivot point in a fixed location;
means for providing a shaft joined at said pivot point;
means for joining a linkage of the transmission to said shaft;
means for adjusting the distance between said pivot point and said linkage to vary the throw of the shifter; and
means for joining a handle to said shaft for operating the shifter.

15. The manual transmission shifter of claim 14, further comprising means for providing vibration dampening.

16. The manual transmission shifter of claim 14, further comprising means for adjustably swiveling said handle.

17. The manual transmission shifter of claim 16, further comprising means for providing vibration dampening.

18. An automobile manual transmission shifter comprising:

a shifter body comprising a pivot point;
a shaft extending through said shifter body and joining to said shifter body at said pivot point, said shaft comprising an upper shaft and a lower shaft, said lower shaft comprising a linkage pivot point at a lower end for connecting to a linkage of the transmission and an adjustable connector joining said upper shaft to said lower shaft wherein the distance between said pivot point and said linkage pivot point is adjusted to vary the throw of the shifter;
a vibration dampening connector disposed in said shaft, said connector dampening at least part of the vibration transmitted from the manual automobile transmission;
means for attaching a shifter handle at a top end of said shaft for operating the shifter; and
a shifter handle being configured to maintain a continuous perpendicular gripping position with respect to a substantially horizontal plane, while allowing rotational adjustment of said shifter handle about a vertical symmetry axis of said shifter shaft in said horizontal plane, said shifter handle being rotatably joined to said top end.

19. The manual transmission shifter of claim 18, in which said dampening connector comprises a mounting boss with a vibration cap mounted thereon.

20. The manual transmission shifter of claim 19, wherein said vibration absorbent cap is made of hardened rubber.

21. The manual transmission shifter of claim 19, wherein the top of said mounting boss comprises a tapped, threaded hole for receiving a shaft joining bolt.

22. The manual transmission shifter of claim 21, wherein the shaft joining bolt is inserted through said shaft from the top thereof and screwed into said treaded hole of said mounting boss.

23. The manual transmission shifter of claim 18, in which said adjustable connector comprises a boss for insertion into said upper shaft.

24. The manual transmission shifter of claim 23, in which said boss and said upper shaft are threaded.

25. The manual transmission shifter of claim 23, in which said adjustable connector comprises a lock screw for securing the connection.

26. The manual transmission shifter of claim 25, in which said boss comprises machined grooves.

27. The manual transmission shifter of claim 26, in which said machined grooves are "V" shaped.

28. The manual transmission shifter of claim 18, wherein said shifter handle comprises a smooth, circular bored hole that is used for the continuous rotatable joining to said top end.

29. The manual transmission shifter of claim 18, wherein said shifter handle comprises a bored hole that is polygonal shaped and used for the step-wise rotatable joining to said top end.

30. The manual transmission shifter of claim 18, wherein said shifter handle comprises a split collar being configured for joining to said top end.

* * * * *